July 1, 1958   E. P. WASHABAUGH   2,841,303
APPARATUS FOR CONSTRUCTING TUNNELS
Filed May 20, 1957   19 Sheets-Sheet 1
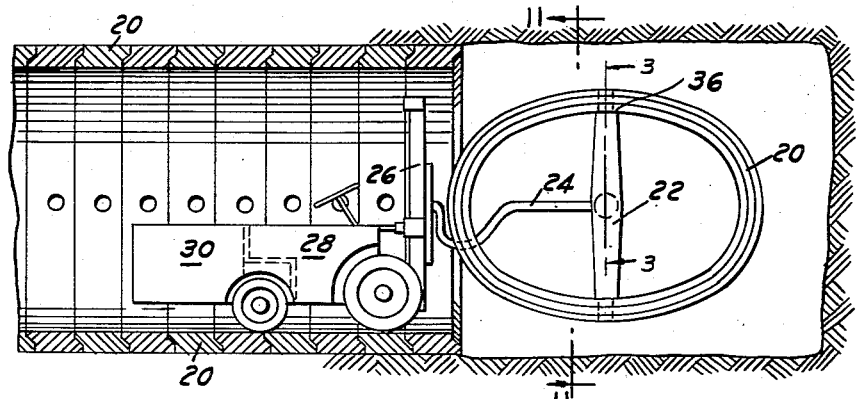
FIG. 1
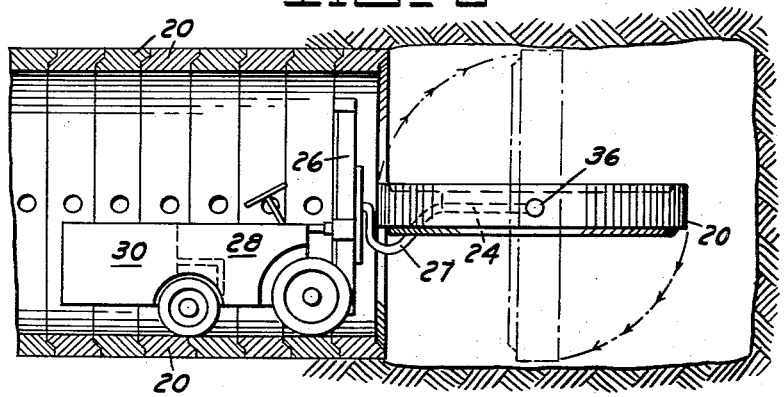
FIG. 2
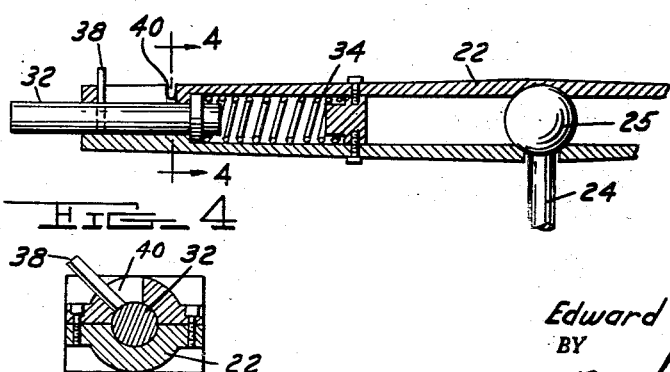
FIG. 3
FIG. 4
INVENTOR.
Edward P. Washabaugh
BY
Burton & Parker
ATTORNEYS July 1, 1958 E. P. WASHABAUGH 2,841,303
APPARATUS FOR CONSTRUCTING TUNNELS
Filed May 20, 1957 19 Sheets-Sheet 2
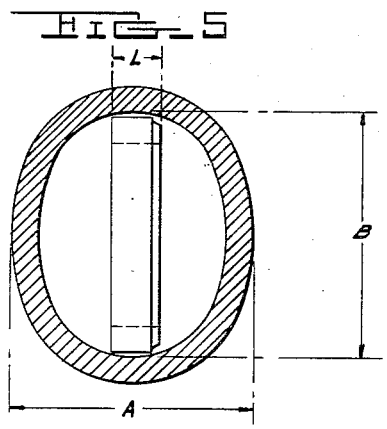
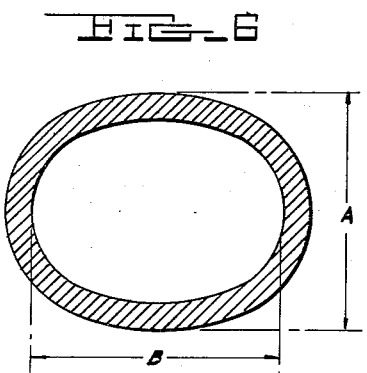
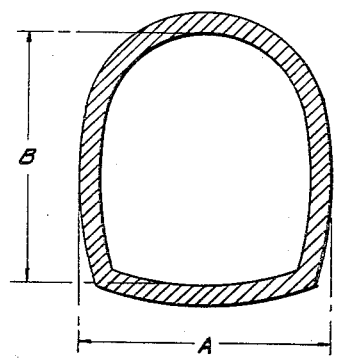
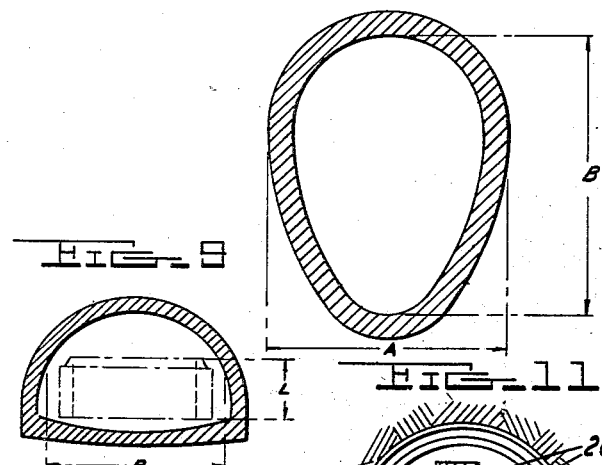
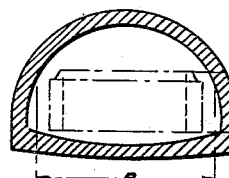
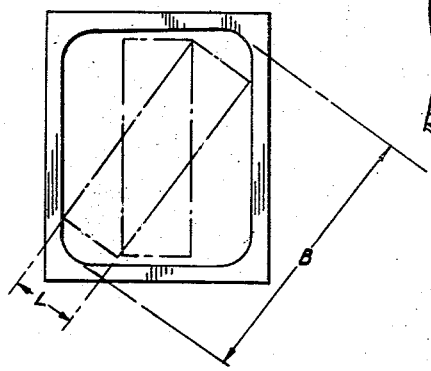
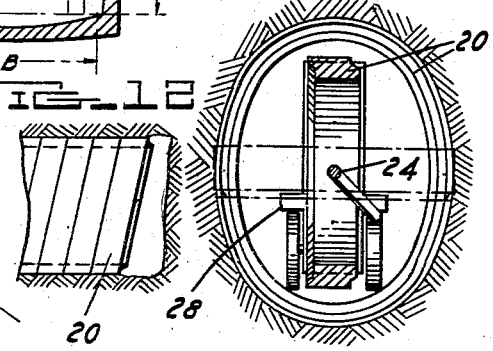
INVENTOR.
Edward P. Washabaugh
BY
Burton E. Parker
ATTORNEYS

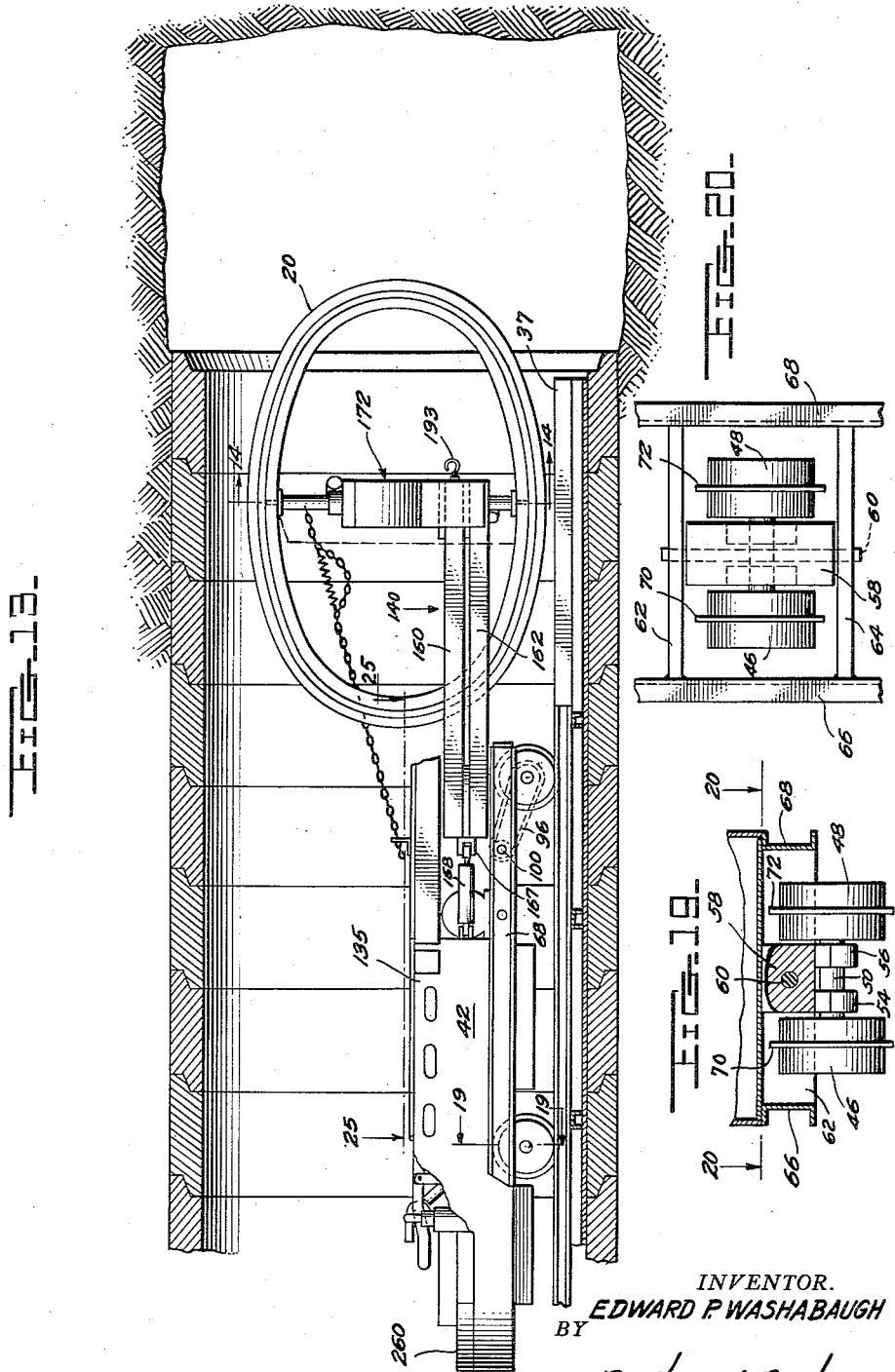

July 1, 1958

E. P. WASHABAUGH 2,841,303

APPARATUS FOR CONSTRUCTING TUNNELS

Filed May 20, 1957

INVENTOR.
EDWARD P. WASHABAUGH
BY

*Burton & Parker*

ATTORNEYS

July 1, 1958   E. P. WASHABAUGH   2,841,303
APPARATUS FOR CONSTRUCTING TUNNELS
Filed May 20, 1957   19 Sheets-Sheet 5
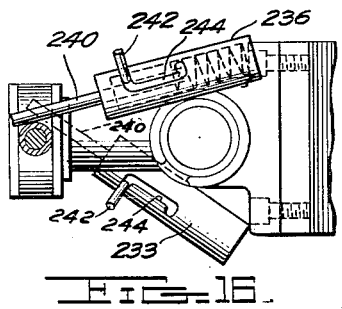
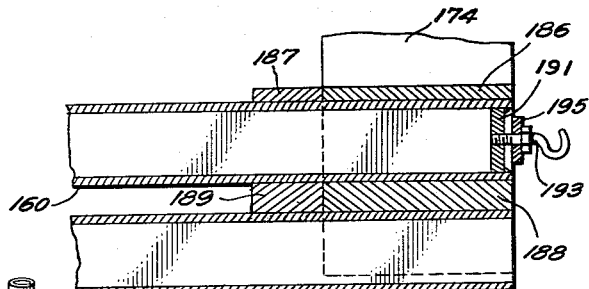
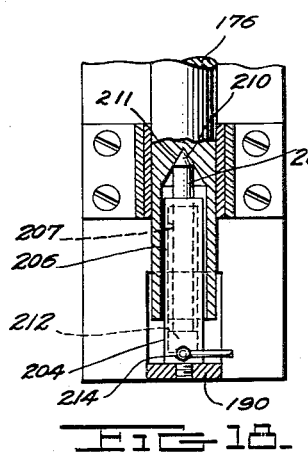
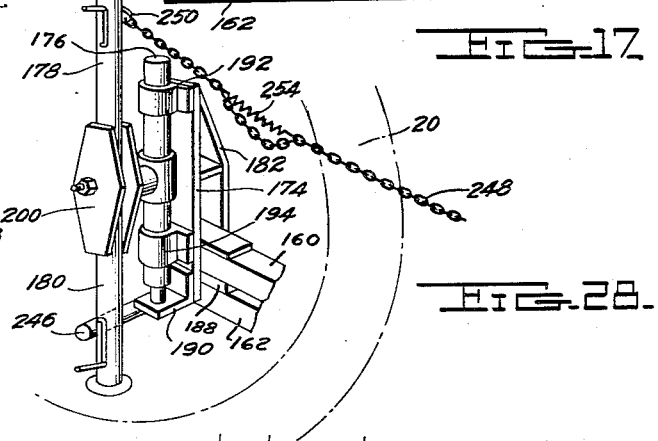
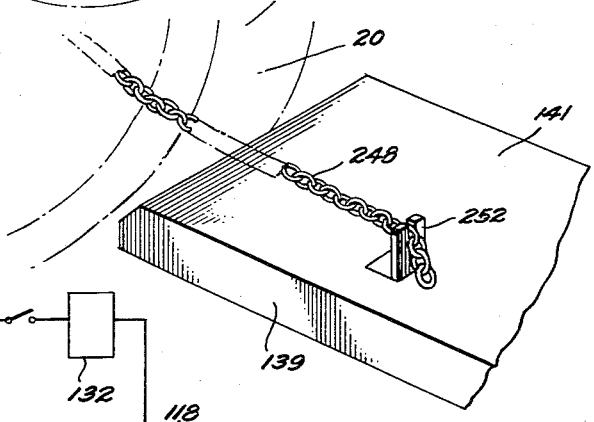
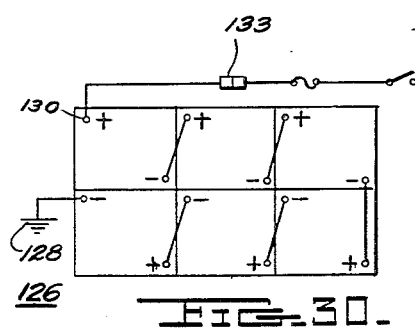
INVENTOR.
EDWARD P. WASHABAUGH
BY
Burton & Parker
ATTORNEYS July 1, 1958
E. P. WASHABAUGH
2,841,303
APPARATUS FOR CONSTRUCTING TUNNELS
Filed May 20, 1957
19 Sheets-Sheet 6
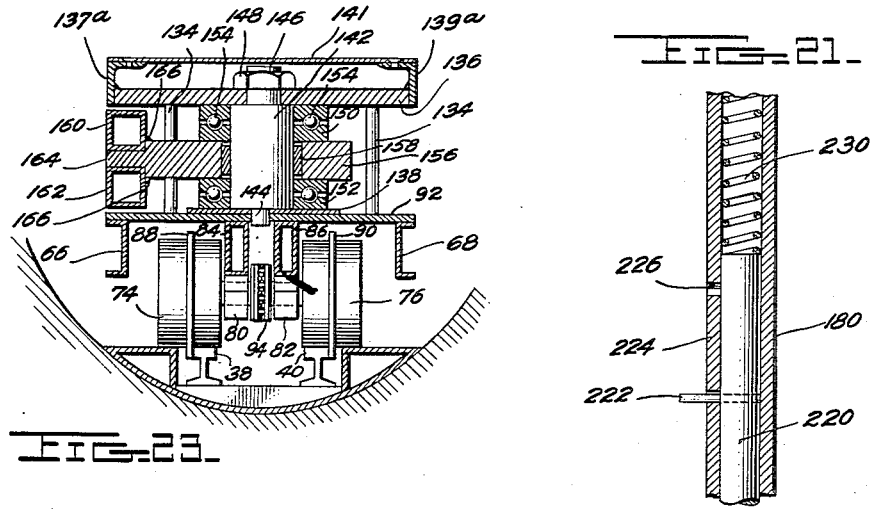
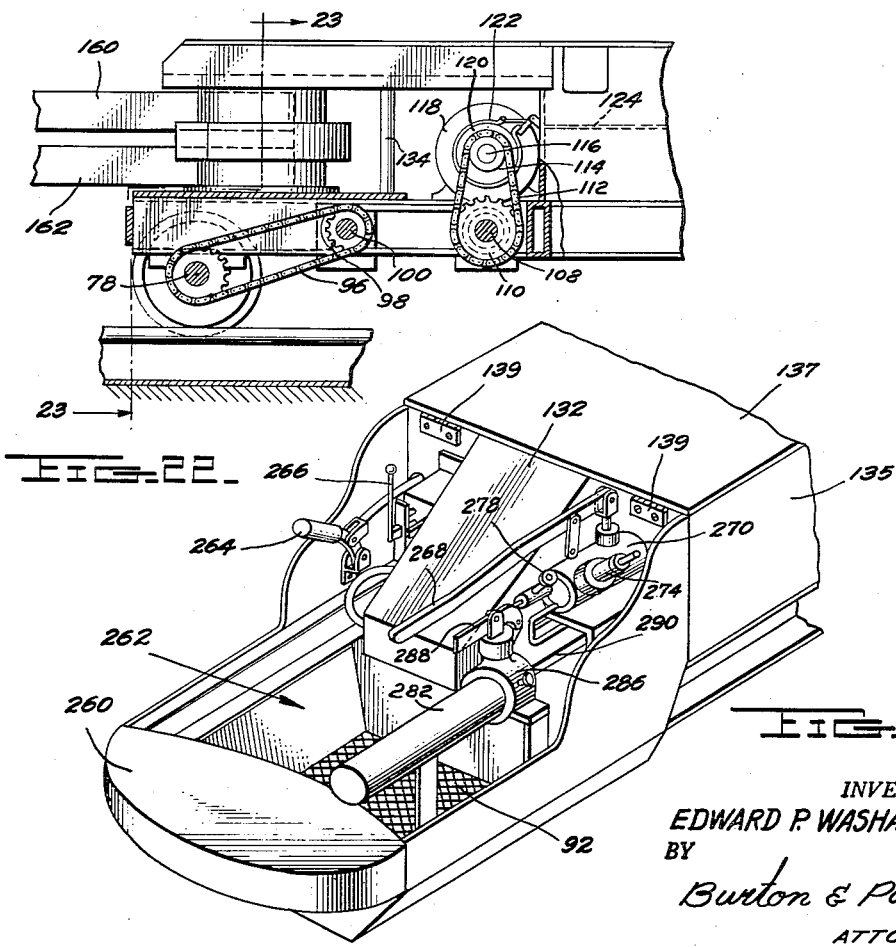
INVENTOR.
EDWARD P. WASHABAUGH
BY
Burton & Parker
ATTORNEYS

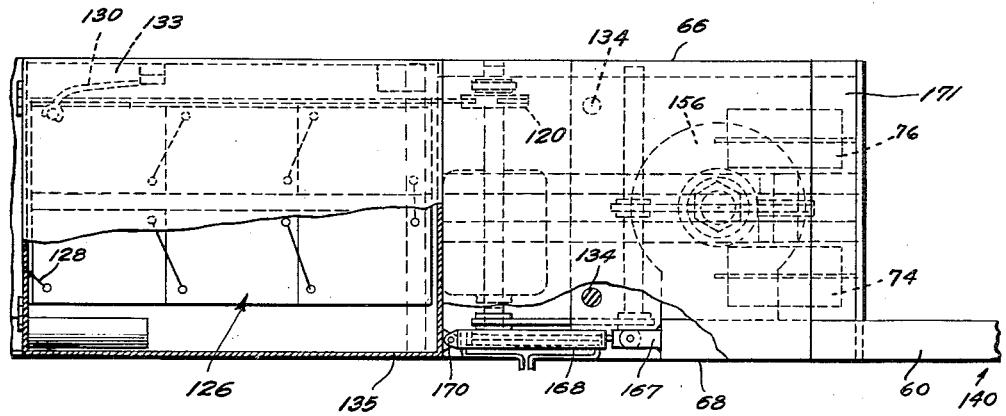
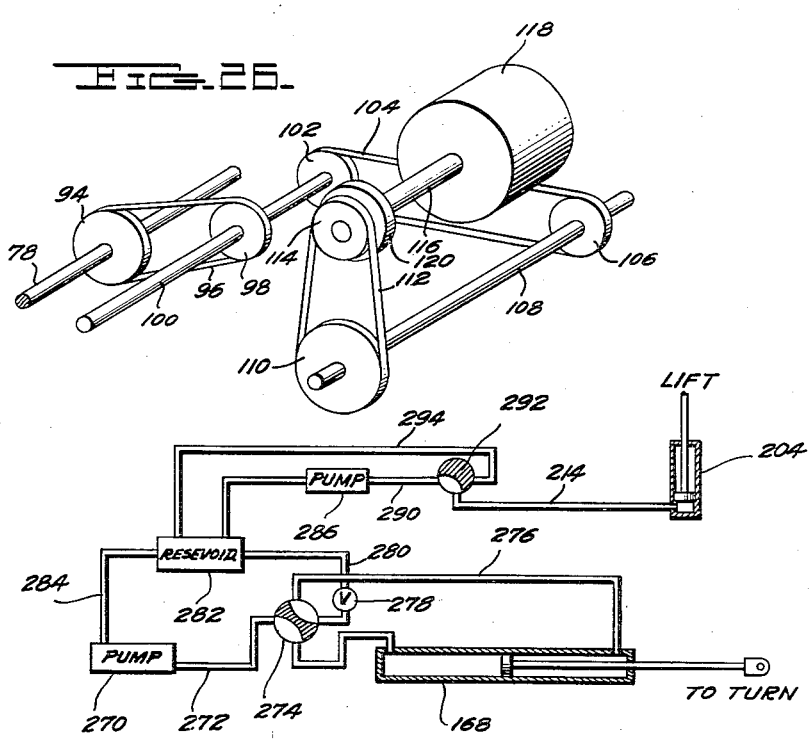

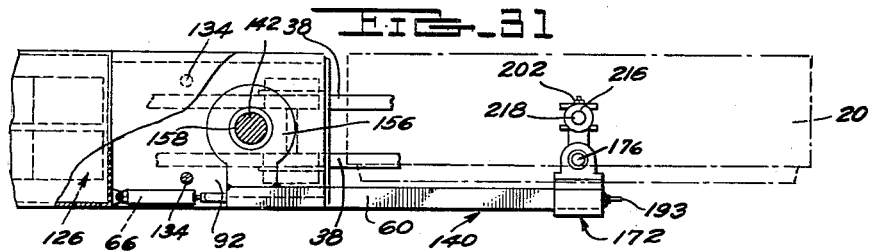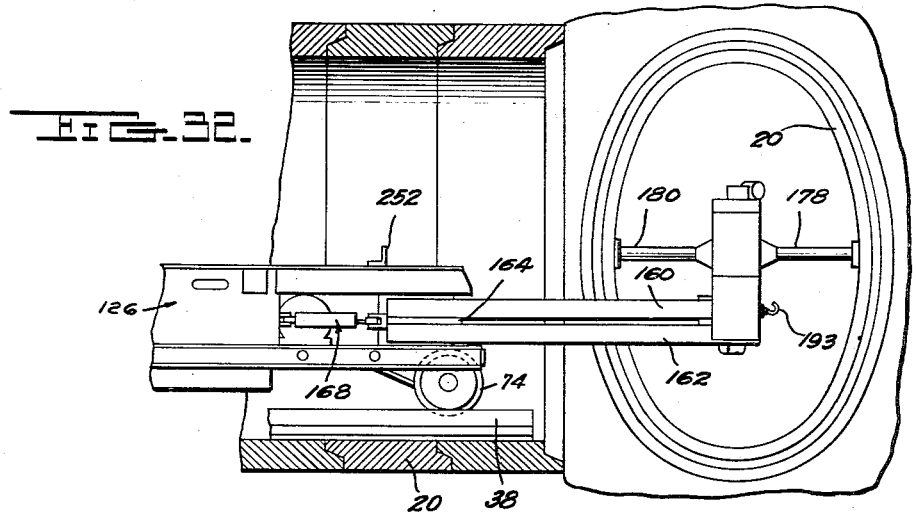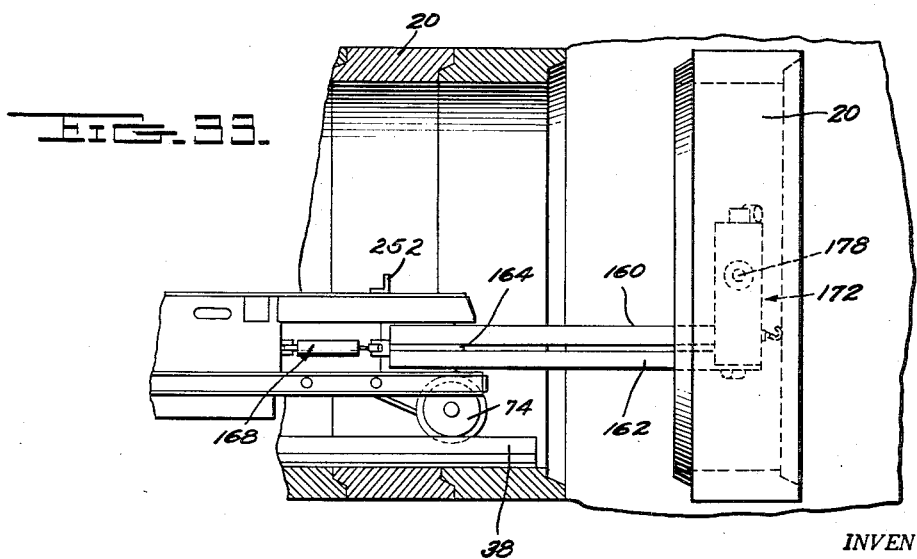

July 1, 1958 E. P. WASHABAUGH 2,841,303
APPARATUS FOR CONSTRUCTING TUNNELS
Filed May 20, 1957 19 Sheets-Sheet 9
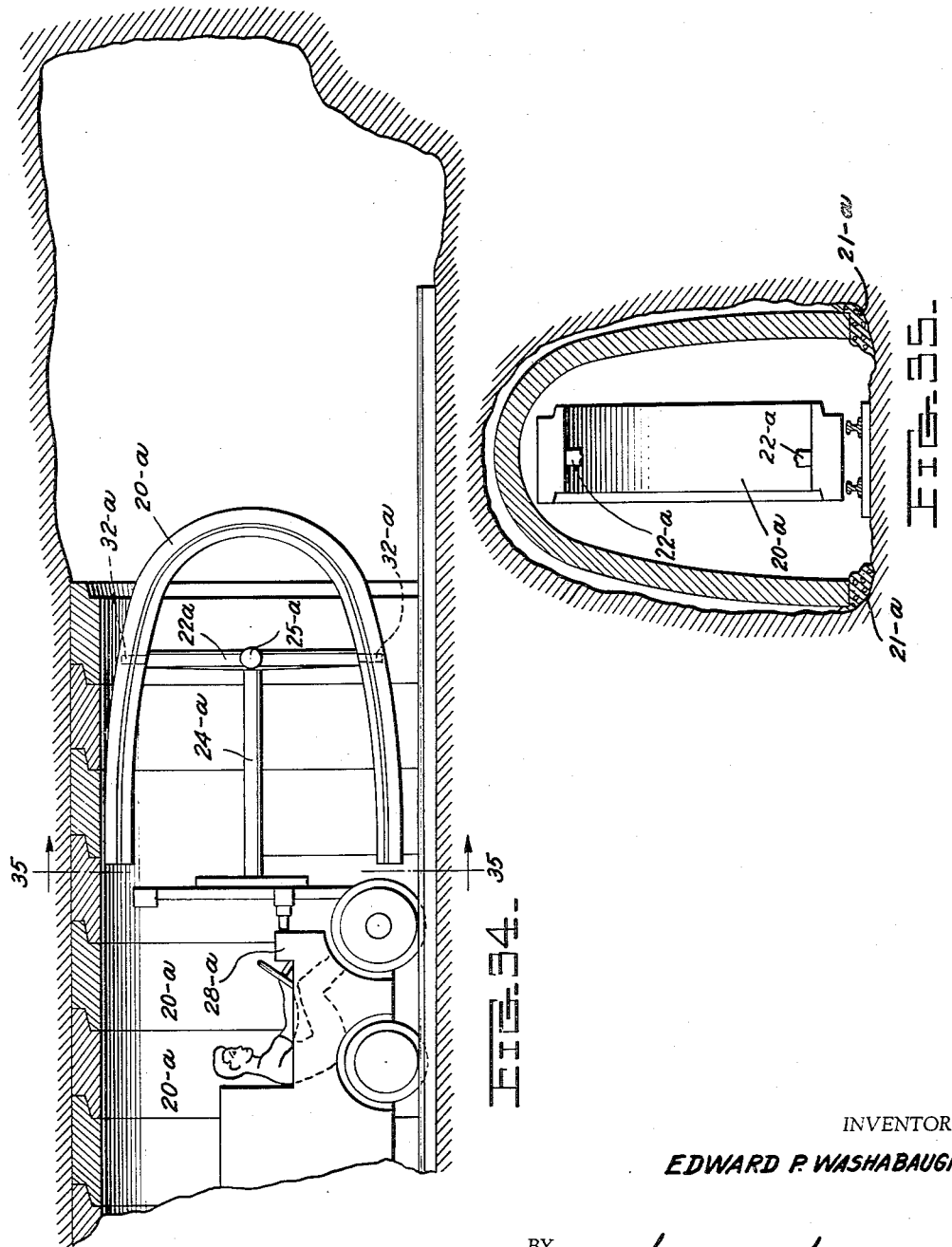
INVENTOR
EDWARD P. WASHABAUGH
BY Burton & Parker
ATTORNEYS July 1, 1958 E. P. WASHABAUGH 2,841,303
APPARATUS FOR CONSTRUCTING TUNNELS
Filed May 20, 1957 19 Sheets-Sheet 10
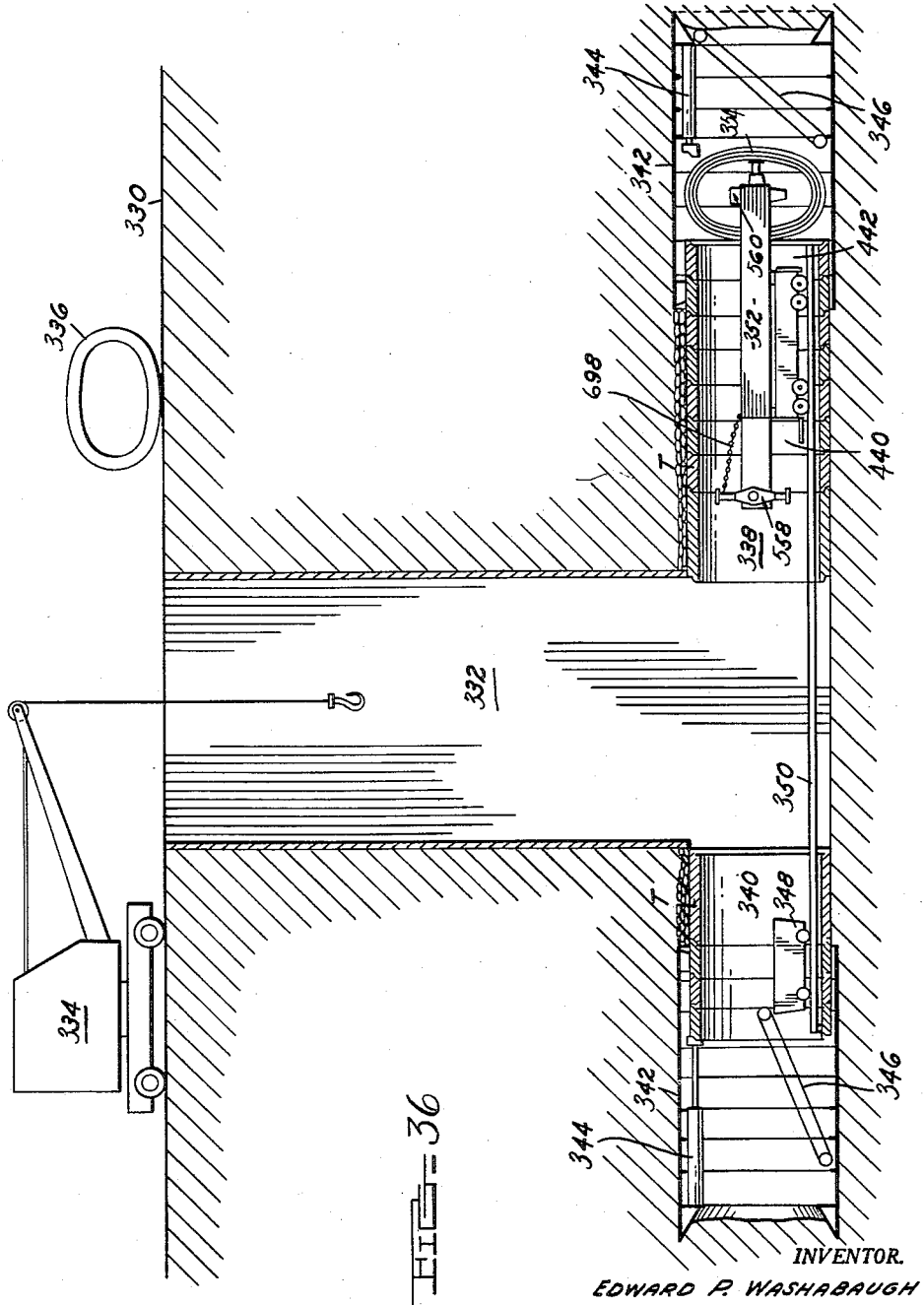

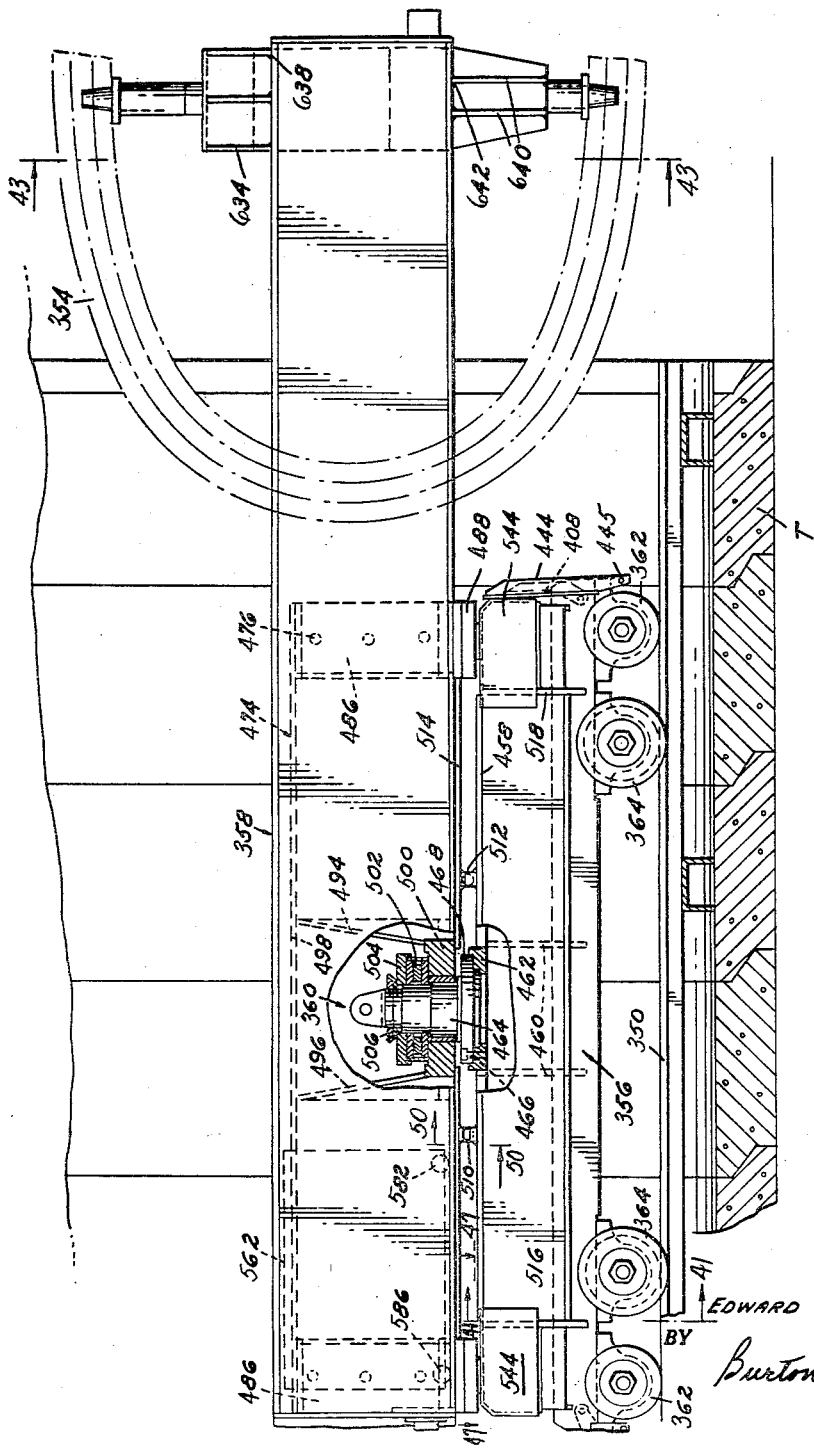

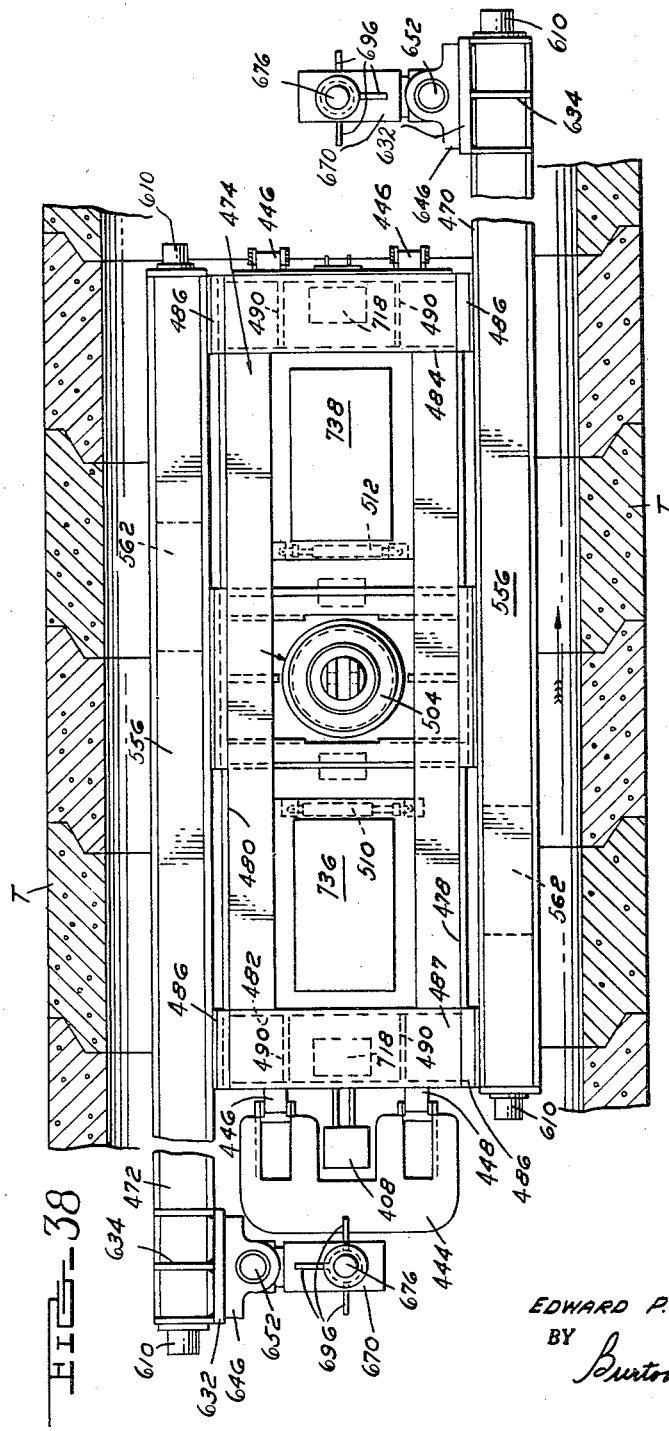

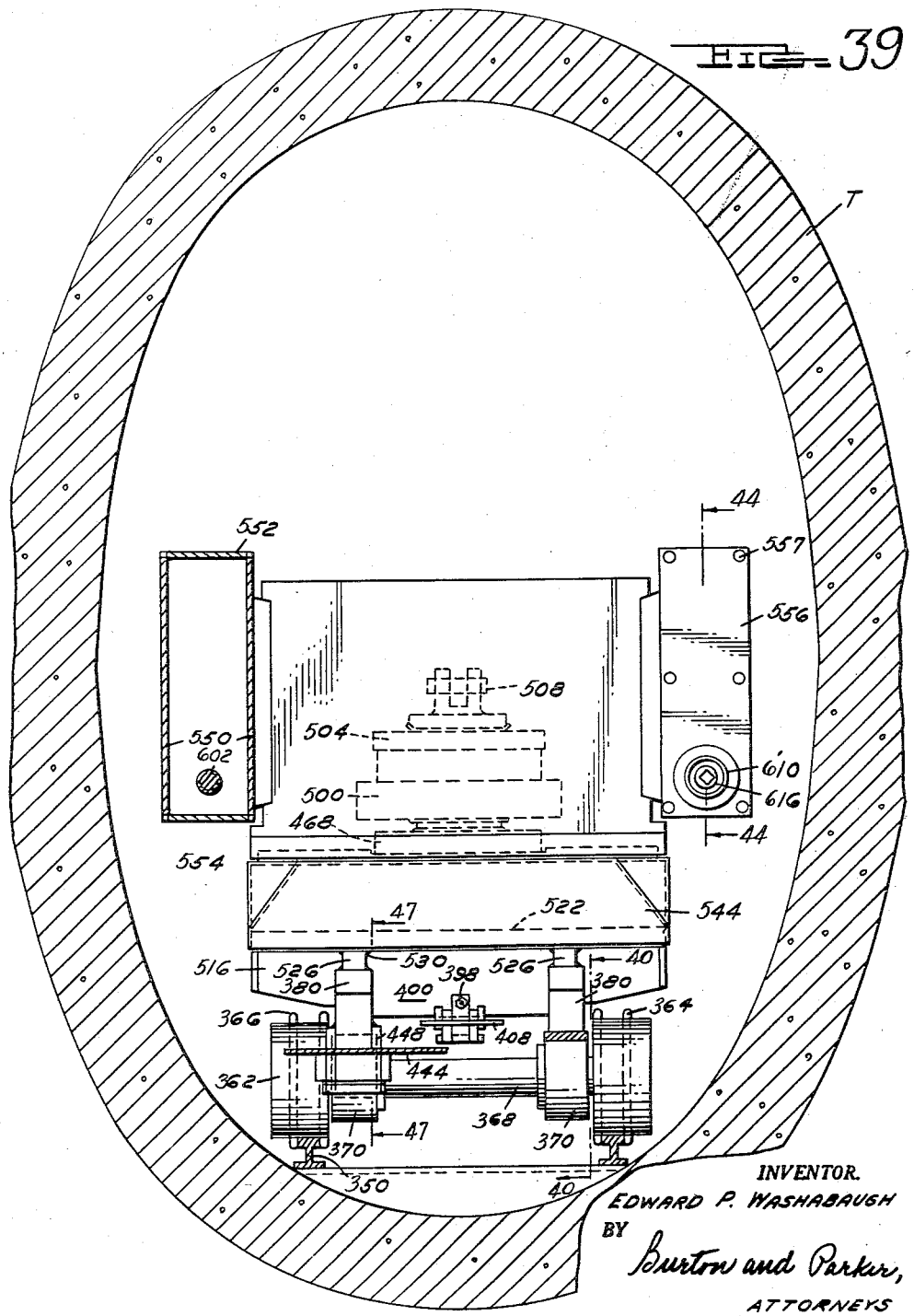

July 1, 1958     E. P. WASHABAUGH     2,841,303
APPARATUS FOR CONSTRUCTING TUNNELS
Filed May 20, 1957     19 Sheets—Sheet 14
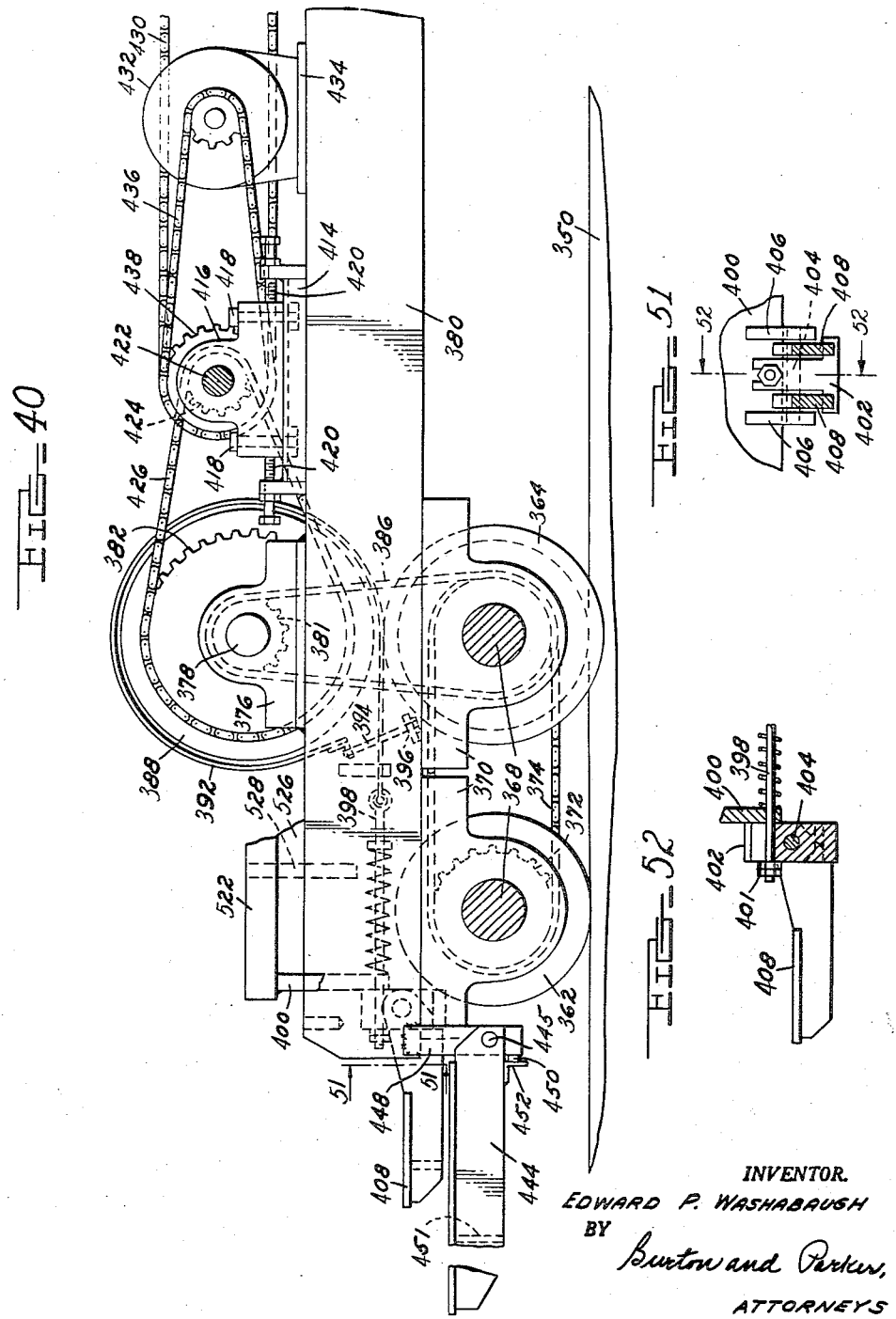
INVENTOR.
EDWARD P. WASHABAUGH
BY
*Burton and Parker,*
ATTORNEYS

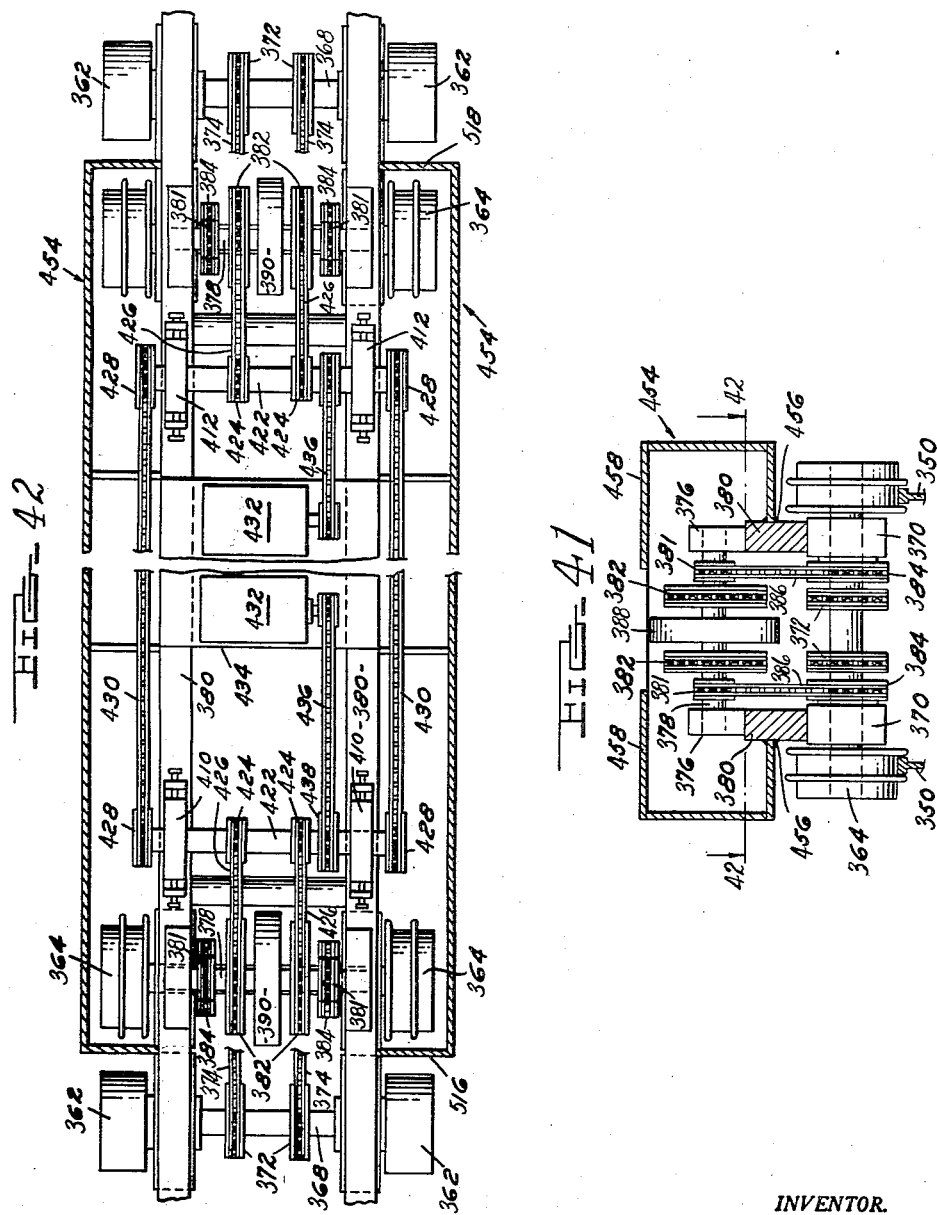

July 1, 1958 E. P. WASHABAUGH 2,841,303
APPARATUS FOR CONSTRUCTING TUNNELS
Filed May 20, 1957 19 Sheets-Sheet 16
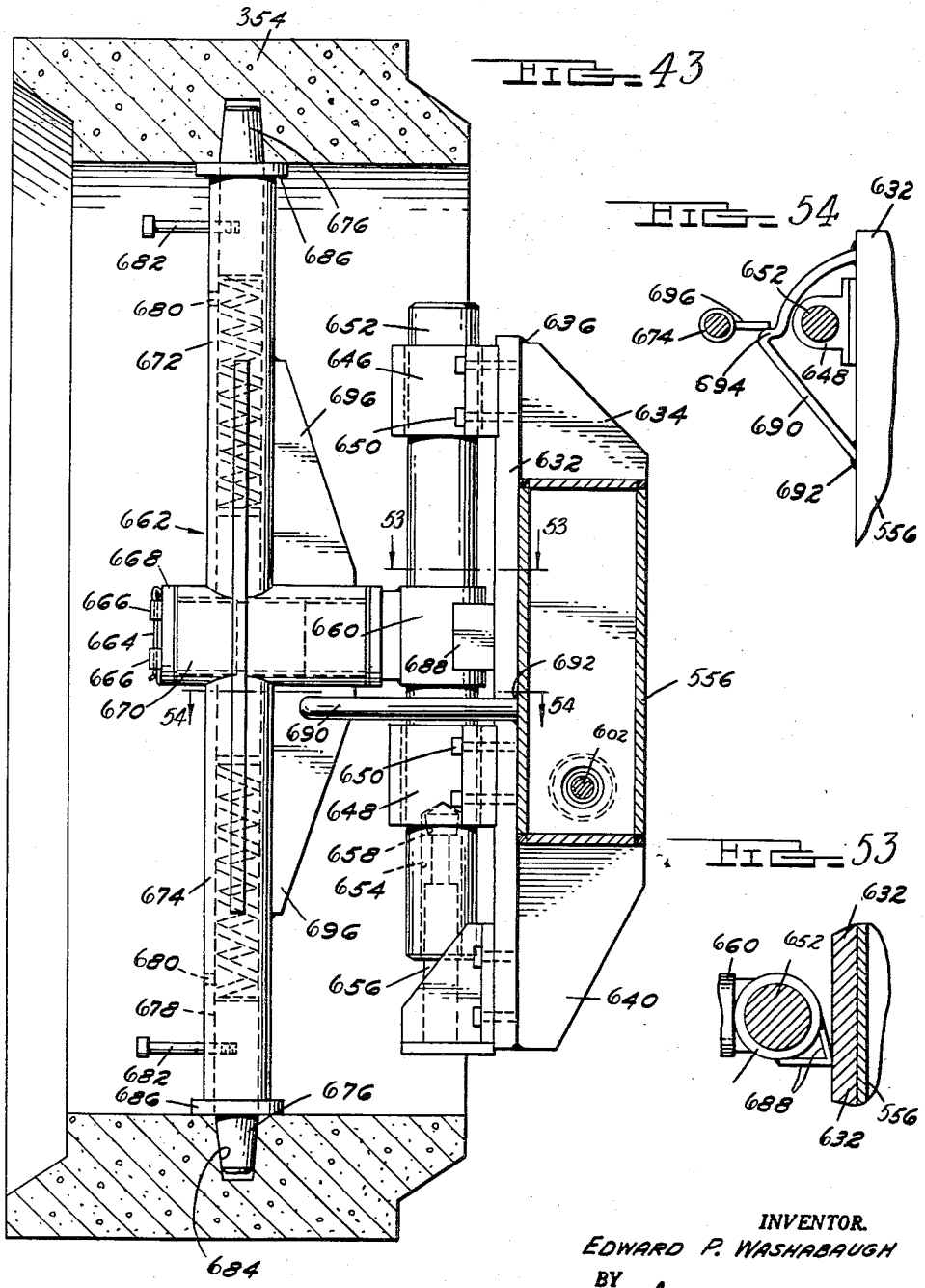
INVENTOR.
EDWARD P. WASHABAUGH
BY
Burton and Parker,
ATTORNEYS

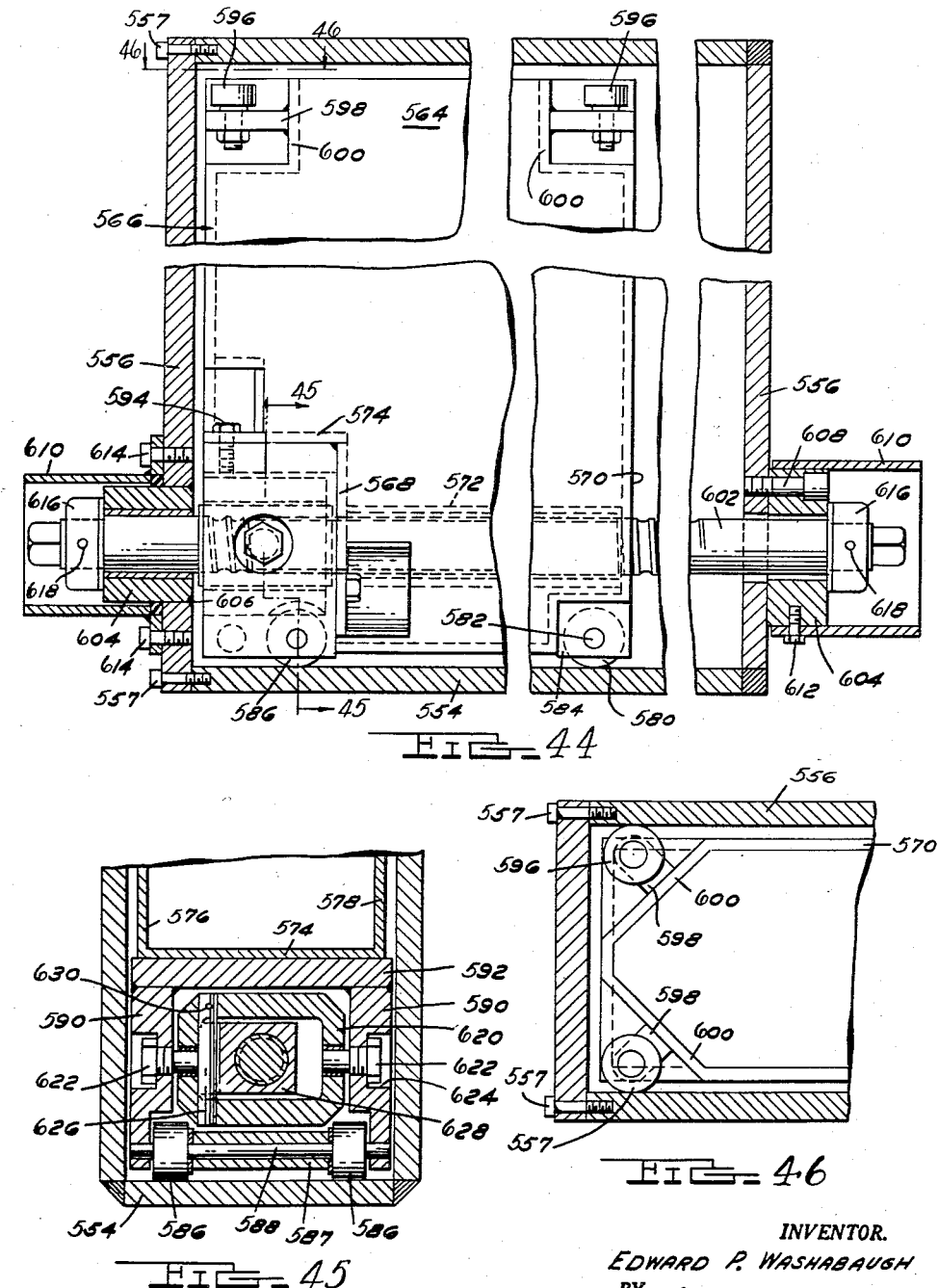

July 1, 1958  E. P. WASHABAUGH  2,841,303
APPARATUS FOR CONSTRUCTING TUNNELS
Filed May 20, 1957  19 Sheets-Sheet 18
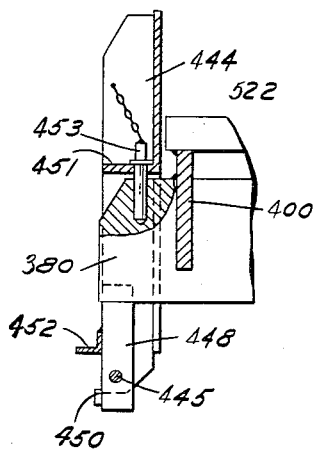
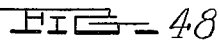
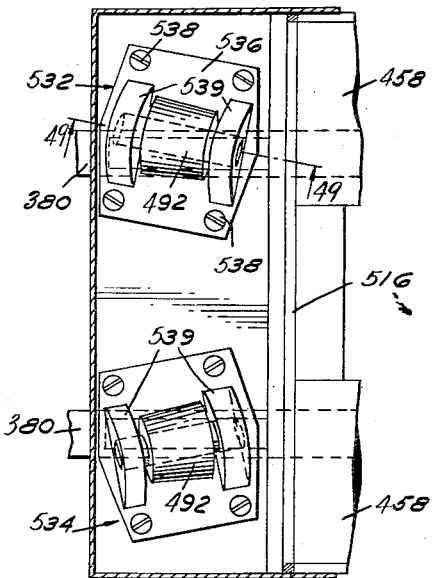
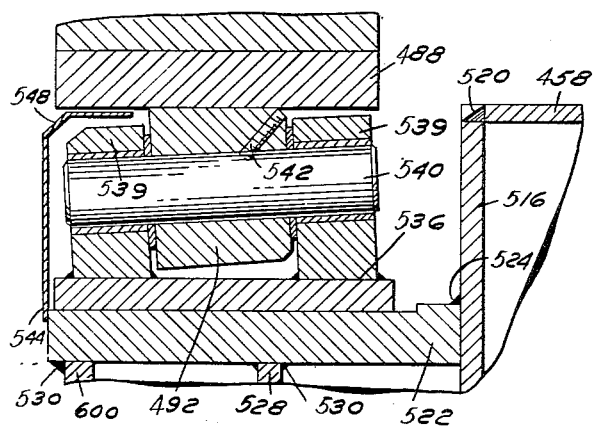
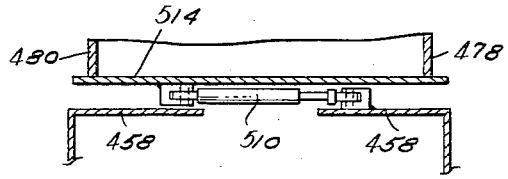
INVENTOR.
EDWARD P. WASHABAUGH
BY
ATTORNEYS

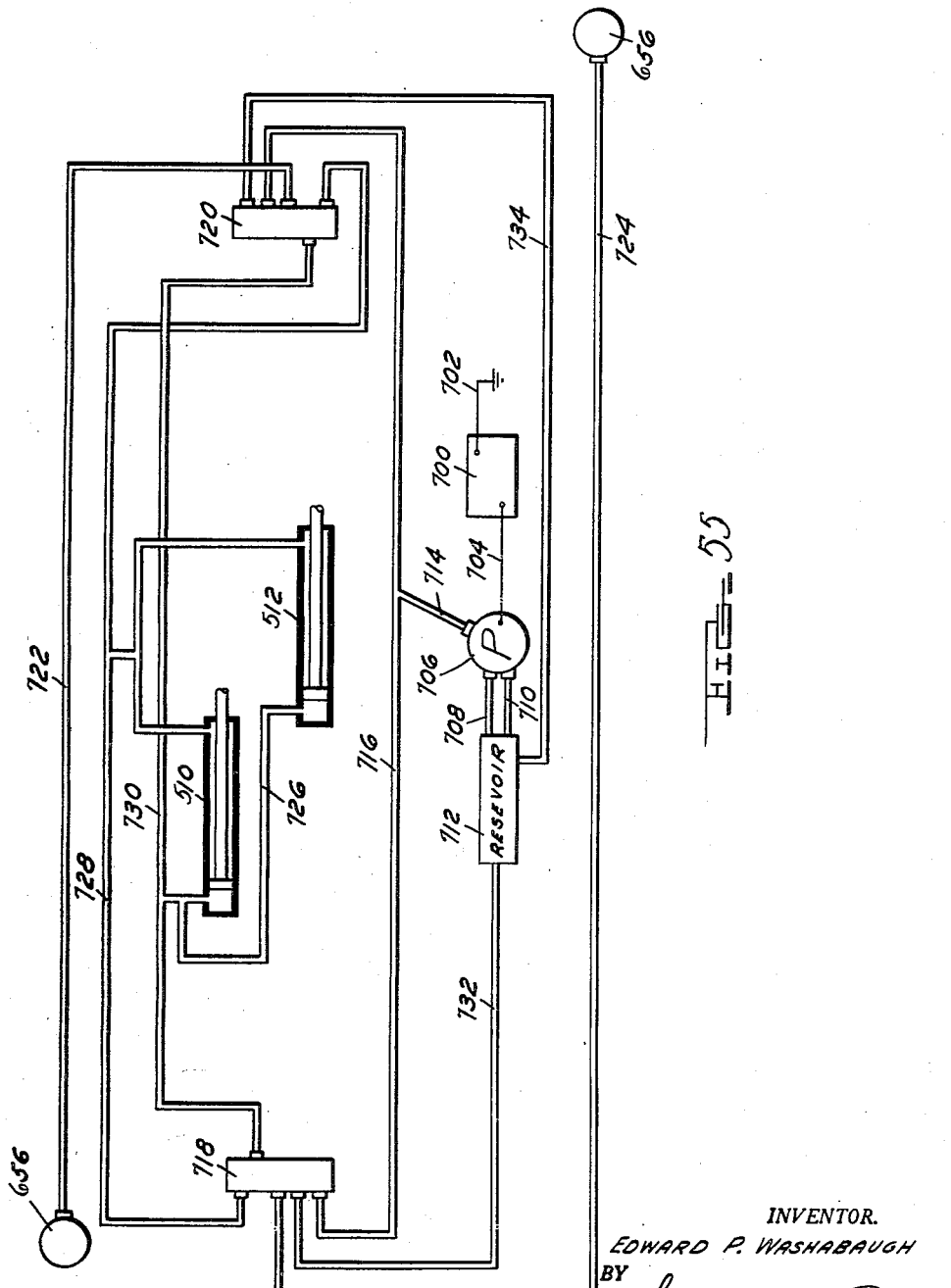

United States Patent Office 2,841,303
Patented July 1, 1958

2,841,303

APPARATUS FOR CONSTRUCTING TUNNELS

Edward P. Washabaugh, Saginaw, Mich., assignor to American-Marietta Company, Chicago, Ill., a corporation of Illinois Application May 20, 1957, Serial No. 662,310

27 Claims. (Cl. 214—652)

This invention relates to apparatus for constructing tunnels, sewers, culverts, or other underground tubes from a plurality of tubular sections. The apparatus has particular, though not exclusive, utility in that method of tunnel construction wherein a plurality of elliptical preformed tunnel sections are installed in the ground as by jacking a number of such sections forwardly, and thereafter passing succeeding elliptical sections through the installed sections, the succeeding sections being of such tubular length that they may be so passed through the installed sections, and rotating and positioning each succeeding section at the leading end of the tunnel to form a tubular continuation thereof.

This application is a consolidated continuation of my two prior filed applications, Serial No. 410,252, filed February 15, 1954, and Serial No. 550,299, filed December 1, 1955. Application Serial No. 410,252 is a continuation-in-part application of my application Serial No. 97,860, filed June 8, 1949, and now abandoned, and also contains disclosure material from application Serial No. 121,467, filed October 15, 1949, and now abandoned.

The tunnel sections intended to be handled by the herein described apparatus are preformed or pre-cast into elliptical ring form. They may be in complete ring form as shown in Figs. 5–10, but may also be in incomplete ring form as shown in Figs. 34 and 35. The words "tunnel ring section" or "tubular tunnel section" or simply "tunnel section" are used herein to describe either the complete or incomplete ring form.

An object of my invention is the provision of apparatus including a car adapted to support a succeeding tunnel section for movement through a completed portion of a tunnel into the heading forwardly thereof, while the car remains within the completed portion of the tunnel.

Another object is the provision of wheeled vehicle apparatus which will support a succeeding tunnel section for movement through a completed portion of a tunnel into the excavated heading and which so supports or suspends the succeeding section within such heading that the succeeding tunnel section may be easily manipulated within the heading for accurate placement against the end of the completed portion of the tunnel to form a tunnel continuation thereof.

A still further object is the provision of a wheeled vehicle having tunnel section carrying boom means projecting beyond the vehicle and which boom means is provided at the outer end with tunnel ring section supporting mechanisms adapted to support a succeeding tunnel ring section for substantially universal movement for placement against the leading end of the completed portion of the tunnel. The tunnel section carrying and supporting vehicle is so counterweighted and balanced that a tunnel section may be supported at the outer end of the boom means beyond the vehicle.

In one form of the invention the apparatus comprises a vehicle having a single boom which projects beyond one end thereof with the apparatus particularly adapted to construct tunnels in only one direction. In another form of the invention, a form particularly adapted to construct tunnels in two opposite directions, the apparatus comprises a vehicle having boom means projecting beyond opposite ends of the vehicle with the boom means adapted to support a tunnel section at either end of the vehicle.

Another object of the invention is the provision of a tunnel section engaging and manipulating head disposed at the outer end of a boom mounted on the wheeled vehicle with such head so constructed and mounted as to engage a tunnel ring section to support the same at its center of mass for rotation, revolution, tilting, and axial and radial displacement to move such ring section into alignment with already installed ring sections at the leading end of a tunnel under construction. Such displacement is accomplished while the section is supported by the boom and while the vehicle and the weight of the section being positioned are within the completed portion of the tunnel and is accomplished in part by movement of the boom, movement of the head, and manipulation of the ring section relative to the supporting boom assembly.

Another object of the invention is the provision in that form of the apparatus having a boom extending beyond opposite ends of the vehicle of a counterweight shiftably mounted on the vehicle and shiftable toward and beyond that end thereof opposite the end at which a tunnel section is supported. Such shiftable counterweight is herein disclosed as being disposed within the booms extending beyond opposite ends of the vehicle.

Other objects, advantages, and meritorious features of the invention will more fully appear from the following description, claims, and accompanying drawings, wherein:

Fig. 1 is a schematic elevation partly in section through a portion of a tunnel showing a complete tunnel ring section being moved by a tunnel section supporting car through the completed portion of the tunnel;

Fig. 2 is a schematic elevation partly in section through a portion of a tunnel showing how the tunnel section carried by a tunnel section supporting car may be rotated ahead of the lead section of the completed portion of the tunnel to the position it will assume in use when placed at an extension ahead of the completed portion of the tunnel;

Fig. 3 is a vertical sectional view taken on the line 3—3 of Fig. 1, but showing the ring engaging pin in the outward position;

Fig. 4 is a vertical sectional view taken on the line 4—4 of Fig. 3;

Fig. 5 is a sectional view through one form of tunnel ring section suitable for use in this invention with the major axis of the ring disposed vertically;

Fig. 6 shows the ring section illustrated in Fig. 1 with its major axis disposed horizontally;

Fig. 7 is a sectional view through another form of suitable tunnel ring section;

Fig. 8 is a sectional view through a third form of tunnel ring section;

Fig. 9 is a sectional view through a further modified shape of ring section;

Fig. 10 is a schematic elevation of another shape of the ring section;

Fig. 11 is a sectional view taken on the line 11—11 of Fig. 1;

Fig. 12 is a schematic elevation partly in section through a portion of a tunnel showing tunnel ring sections disposed at an angle to the vertical;

Fig. 13 is an elevation partly in section through a portion of a tunnel showing a complete tunnel ring section being moved by a preferred embodiment of the tunnel section supporting and positioning apparatus through the completed portion of the tunnel. This is a more complete structural embodiment of the construction of Fig. 1;

Fig. 16 is a cross sectional view taken on line 16—16 of Fig. 14;

Fig. 17 is a cross sectional view taken on line 17—17 of Fig. 14 and showing the construction of the outer end of the tunnel section supporting boom;

Fig. 18 is a cross sectional view through the tunnel section supporting head taken on line 18—18 of Fig. 14;

Fig. 19 is a cross sectional view through the rear wheel truck section of the vehicle taken on line 19—19 of Fig. 13;

Fig. 20 is a cross sectional view taken on line 20—20 of Fig. 19 looking down on the rear wheel truck;

Fig. 21 is a cross sectional view taken on line 21—21 of Fig. 15;

Fig. 22 is a side elevation partly in section through the forward end of the tunnel section supporting car showing the driving connection for the front wheels thereof;

Fig. 23 is a cross sectional view taken on line 23—23 of Fig. 22 showing the front wheel drive;

Fig. 24 is a perspective view of the cockpit and control devices of the tunnel section supporting car;

Fig. 25 is a top view of the tunnel section supporting car taken on line 25—25 of Fig. 13;

Fig. 26 is a schematic view of the driving connection for the tunnel section supporting car between the wheels thereof and the driving motor;

Fig. 27 is a schematic view of the hydraulic system of the tunnel section supporting car;

Fig. 28 is a view of the tunnel section supporting head showing the employment of a spring chain to prevent movement of a tunnel section supported on the head;

Fig. 29 is a detail view of the manner of coupling the spring chain to the tunnel section supporting car;

Fig. 30 is a diagram of the electrical system;

Fig. 31 is a plan looking down on the boom assembly showing the ring as it is supported for movement through the tunnel;

Fig. 32 is a section through the heading and adjacent forward end of the tunnel showing the ring within the heading and rotated from the position in which it is carried;

Fig. 33 is a section through the heading and adjacent forward end of the tunnel showing the ring within the heading and rotated to position to be withdrawn against the completed portion of the tunnel;

Fig. 34 is a vertical cross section through the tunnel similar to Fig. 1 but representing a modified form of tunnel section;

Fig. 35 is a cross sectional view taken on line 35—35 of Fig. 34;

Fig. 36 is a cross sectional schematic view through a section of ground in which an access shaft has been sunk and showing the construction of a tunnel in opposite directions away from the access shaft and wherein my improved apparatus is employed;

Fig. 37 is a fragmentary side view of my improved tunnel section handling apparatus with a tunnel section carried at one end of the boom means;

Fig. 38 is a top view of my improved tunnel section handling apparatus showing it within the completed portion of a tunnel;

Fig. 39 is an end view of my improved apparatus;

Fig. 40 is a cross sectional view taken on the line 40—40 of Fig. 39;

Fig. 41 is a cross sectional view taken on the line 41—41 of Fig. 37;

Fig. 42 is a semi-diagrammatic cross sectional view taken on the line 42—42 of Fig. 40;

Fig. 43 is a cross sectional view taken on the line 43—43 of Fig. 37;

Fig. 44 is a cross sectional view taken on the line 44—44 of Fig. 39;

Fig. 45 is a cross sectional view taken on the line 45—45 of Fig. 44;

Fig. 46 is a cross sectional view taken on the line 46—46 of Fig. 44;

Fig. 47 is a cross sectional view taken on the line 47—47 of Fig. 39;

Fig. 48 is a cross sectional view taken on the line 48—48 of Fig. 37;

Fig. 49 is a cross sectional view taken on the line 49—49 of Fig. 48;

Fig. 50 is a cross sectional view taken on the line 50—50 of Fig. 37;

Fig. 51 is a cross sectional view taken on the line 51—51 of Fig. 40;

Fig. 52 is a cross sectional view taken on the line 52—52 of Fig. 51;

Fig. 53 is a cross sectional view taken on the line 53—53 of Fig. 43;

Fig. 54 is a cross sectional view taken on the line 54—54 of Fig. 43; and

Fig. 55 is a schematic view of the hydraulic circuit of my improved tunnel section handling apparatus.

Figure 15:
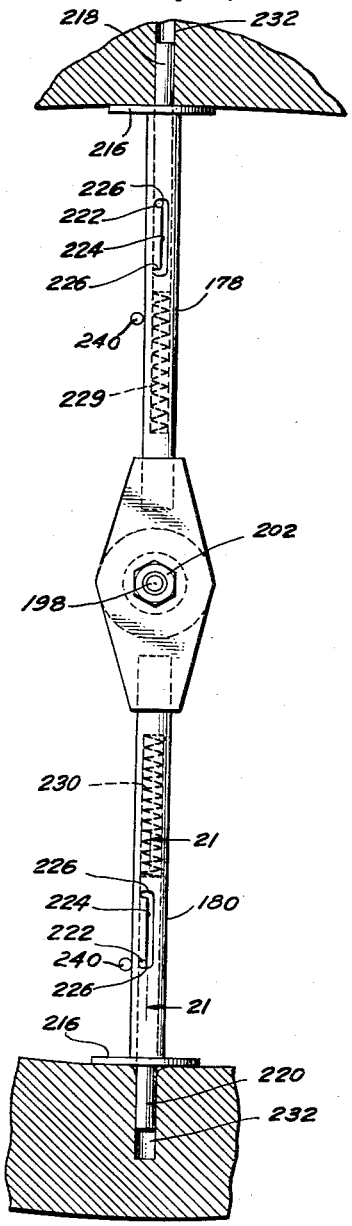
Fig. 15 is a cross sectional view taken on line 15—15 of Fig. 14.

A tunnel ring section utilizable in the method of constructing a tunnel heretofore mentioned has to be of such a shape and so dimensioned that one ring section when disposed at a determined relative position with respect to another identical ring section may be passed therethrough. As shown, each tunnel ring section constitutes a full ring except in Figs. 34 and 35. Each section exhibits a major axis and a minor axis. In Figs. 34 and 35 the tunnel sections are incomplete arch-shaped ring sections. The outside dimension along its minor axis is somewhat less than the inside dimension along its major axis and the tubular axial dimension or length through the ring is such that when one ring is disposed in a vertical plane with its major axis disposed vertically, another identical ring may be passed therethrough by disposing it in a vertical plane with its minor axis vertical and with its major axis horizontal and extending substantially parallel to the tubular axis of the first ring. It is, of course, obvious that the second ring could be passed through the first ring even though the first ring were disposed in a horizontal plane or in any other manner so long as the relative disposition of the two rings was preserved. It is apparent that rings may exhibit the shape and dimensions above set forth and vary somewhat in shape from each other. Generally the ring takes an oblong form, whether it is a variation from the square or from the circle.

In Figs. 5 and 6 the ring sections are oblong in the sense of a departure from the circle being of a generally oval shape. In Fig. 7 a generally oval ring has its bottom flattened. In Fig. 8 the ring is of an egg shape. In Fig. 9 the ring is generally oblong having a bottom shaped somewhat like the ring of Fig. 7 with the remaining portion of the ring being arcuate. Fig. 10 shows a rectangular ring. Figs. 34 and 36 show incomplete arch-shaped rings.

It will be noted that in each of these figures, there is a major axial and a minor axial dimension and that the minor axial dimension on the outside measurement is less than the inside measurement of the major axial dimension. In Figs. 5, 7, and 8, the major inside axial dimension is vertical and is represented by the distance B and the minor outside axial dimension is horizontal and is represented by the distance A. In Fig. 6, the major axial inside dimension is also represented by the distance B but is horizontal and the minor outside axial dimension is also represented by the distance A, but is vertical. The same is true of Fig. 9. In Fig. 10 the same letters are used to indicate the major inside axial dimension and the minor outside axial dimension.

In each figure where it is shown, the axial tubular dimension is indicated by the letter L. It will be seen that there is a definite relationship which includes all three dimensions. In other words, the axial tubular dimension cannot exceed a certain figure, depending upon the other dimensions, if one tubular section is to be passed through an identical tubular section. Tubular sections will be provided in the sizes and shapes desired depending upon the type of underground tube to be built, but the relative dimensions and shape will be as set forth.

In the several figures, and particularly in Figs. 1 and 2, each ring section is indicated by the numeral 20. These sections may be formed of concrete, reinforced concrete, vitrified clay, steel, iron, or any other standard material. The sections are preformed or precast and may be made in any suitable manner. Due to the preformation of the sections they may be readily inspected prior to use. In Figs. 1 and 2 the several ring sections are shown as having axial faces which are stepped or rabbeted so as to interfit together as illustrated. In these two figures the several ring sections are disposed in a vertical plane. The several tunnel sections may, however, be arranged as shown in Fig. 12 in which the sections are not in a vertical plane but at an angle thereto so that the crown of the section overhangs forwardly and offers some protection.

The method consists of carrying each ring section needed through the finished portion of the tunnel by so disposing the ring section to be transported, as heretofore described, that it may be moved through the completed portion of the tunnel and after it is moved therethrough into the heading and while it is supported disposed within the heading but with the weight taken from within the completed portion of the tunnel rotating and otherwise manipulating such ring section to line it up with the ring sections already in place. The ring section being transported may be carried by wheeled tunnel section supporting and positioning apparatus such as generically illustrated in Figs. 1 and 2. In Figs. 13–29 a preferred structural embodiment of such apparatus is illustrated.

In the schematic form of tunnel section supporting car, illustrated in Figs. 1 and 2, the ring section 20 is supported by a strut 22 carried by a forwardly projecting boom 24 which is in turn supported by the upright standard 26 of a tunnel section supporting car 28. The tunnel section supporting car may have its rear end 30 weighted by mounting its engine and machinery therein. The strut 22 is shown as being journaled upon the ball 25 of the arm end 24 so that it may be rotated thereabout. The arm 24 is supported by the standard 26 to be raised or lowered or otherwise shifted as desired.

The boom itself is provided with a bend or curvature therein indicated as 27 which permits a ring section to be swung to the position shown in solid line in Fig. 2. The opposite ends of the strut 22 are provided with ring carrying pins 32 held outwardly by springs 34 so that the pins 32 may be projected through apertures 36 formed at diametrically opposite points in a ring section 20, as shown in Figs. 1 and 2, whereby the strut serves to securely support a ring to be lifted and moved as desired by the strut. To hold the pins 32 at adjusted positions, each pin 32 is provided with a locking pin 38 adapted to be received within a slot 40 so as to hold the pin retracted against the spring 34.

When a ring is picked up by the tunnel section supporting car and mounted upon the strut 22 such ring is swung to the position shown in Fig. 1. In Fig. 1 the rings that have been placed to form the tunnel are shown disposed with their major axes vertical. The ring being transported is disposed with its minor axis vertical and its major axis substantially parallel with the tubular axis of the tunnel. The ring is moved by the car to the position shown in Fig. 1 with the ring in the unlined heading portion of the bore ahead of the completed tunnel portion. The ring may there be rotated first about the horizontal axis to move it to the position shown in solid line in Fig. 2. It may be rotated from such solid line position of Fig. 2 to the dotted line position of Fig. 2. The ring may be shifted otherwise as desired to align the same with the completed portion of the tunnel.

The tunnel section supporting car may be backed up to withdraw this supported ring section into axial abutment against the forward section of the completed portion of the tunnel. These changes in position of the ring section from the position for transportation through the tube to its final position as a part of the completed tube can be made in the order described or in various combinations or stages which accomplish the same purpose. The method applies to the transportation of any ring section shown in the figures of the drawing, as, for example, ring sections such as shown in Figs. 7, 8, 9, and 10.

The aperture 36 in the wall of the ring section serves not only the purpose of mounting the ring sections upon the pins at the ends of the strut but also serves as a discharge outlet for grout to be pumped through to the outside of the liner. It would also serve as an exit for the pumping of water through to lubricate the outside of the liner if the jacking method were being employed in jacking successive portions of a tunnel along in the manner heretofore suggested. Such aperture 36 might, however, extend only part way through the ring, extending only such distance thereinto from the inside as to serve as a seat for the supporting pin 32.

It will be noted that the ring is supported from its center of mass so that it may be readily manually rotated about different axes of rotation to align it with the completed portion of the tunnel. This is a matter of importance to accurate, easy alignment.

In Figs. 34 and 35 the tunnel sections are indicated as 20$^a$. They are arch-shaped incomplete rings. The car is illustrated schematically as it is in Figs. 1 and 2 and is indicated as 28$^a$. A boom 24$^a$ projects forwardly from the car. An arm 22$^a$ is pivoted on the outer ball end 25$^a$ of the boom. The ends of the arm 22$^a$ are provided with pins or reduced diameter extensions 32$^a$ to engage the tunnel ring sections. The tunnel ring section is transported and manipulated as shown and as described heretofore in connection with the rings of Figs. 1 and 2. The two ends of the arch-shaped ring may be mounted on concrete shoulders or the like 21$^a$.

In Figs. 13–29 is shown tunnel ring section supporting and positioning apparatus of a commercial character. In Fig. 13, the car is shown as supporting what is to be termed a "succeeding tunnel ring section" for movement through a completed portion of the tunnel. The succeeding section is shown as supported partially within the completed portion of the tunnel and partially within the heading ahead of such completed portion. The section is shown as supported in the same plane as the succeeding section shown in Figs. 1 and 2, i. e., with the corresponding axes of the succeeding section and the installed sections being perpendicular and the major axis of the succeeding section parallel to the tubular axis of the installed sections. The forward end of the car is to be considered the right-hand end as shown in Fig. 13, and the rear end of the car is to be considered the left-hand, as shown in Fig. 13.

As is more particularly shown in Figs. 13 and 23, a track 37 comprising a pair of rails 38 and 40 is laid in the bottom of the completed portion of the tunnel. The car, generally indicated as 42, is adapted to travel over this track. Four wheels mounted upon a pair of trucks are adapted to support the car upon the track. One pair of wheels, 46 and 48, shown in Fig. 19, is mounted upon opposite ends of an axle 50 which is secured by a pair of bearings 54 and 56 to a block 58 journaled upon a shaft 60.

As shown in Figs. 19 and 20, the rectangular block 58 is pivotally mounted upon the shaft 60 which is supported between a pair of cross members 62 and 64 which form a part of the car. The car 42 is provided with a pair of longitudinal frame members 66 and 68 which extend along the opposite sides thereof and to which the cross members 62 and 64 are secured. The wheels 46 and 48 (Figs. 19–20) exhibit peripheral flanges 70 and 72 which overlie the outside edges of the rails 38 and 40. The wheels 46 and 48 thus pivotally support the car at the rear end thereof.

The forward end of the car is supported by a second pair of wheels 74 and 76 (Fig. 23) which are fixedly mounted upon an axle 78 (Fig. 22) which is, in turn, rotatably mounted in the bearing blocks 80 and 82. The bearing blocks are spaced apart as shown in such Fig. 23 and are secured to the rectangular frame members 84 and 86 mounted on the underside of the car 44. The wheels 74 and 76 are provided with peripheral flanges 88 and 90 which overlie the outside edges of the rails 38 and 40 and thereby keep the car on the track. A plate 92 rests upon and is secured to the side frame members 66 and 68 of the car and it is to this plate that the rectangular frame members 84 and 86 are secured.

By virtue of the wheels at the rear of the car being carried by a swivelled truck, the car can travel on all four wheels over rails which are not necessarily always in a horizontal plane. One rail may be higher at one point than its parallel corresponding rail and still all four wheels of the car will remain on the track. It is highly important that all four wheels of the car remain at all times upon the rails because when a succeeding tunnel section weighing well over a ton is supported, as here, forwardly of the car and is revolved and displaced to position it against the end of the completed portion of the tunnel to form a tubular continuation thereof, as is more particularly pointed out hereinafter, a firm support for the succeeding section is essential if the section is to be accurately positioned and aligned with the end of the completed tunnel. The pivotal support of the rear end of the car upon wheels 46 and 48 will allow for any unevenness of the track and ensure the constant contact of all four wheels of the car with the rails.

As shown in Figs. 22, 23, and 26, a driven sprocket 94 is fixed upon the axle 78 which carries the wheels 74 and 76. This sprocket is disposed between the bearing blocks 80 and 82. A drive chain 96 passes around this sprocket and up over a sprocket 98 mounted on a shaft 100 which shaft extends across the car and is rotatably supported in bearings on opposite sides thereof on the frame members 66 and 68. A second sprocket 102 is also mounted upon shaft 100. Chain 104 couples sprocket 102 with sprocket 106 mounted on shaft 108 which shaft extends across the car and is rotatably supported in bearings within the frame members 66 and 68. The shaft 108 carries a sprocket 110 mounted thereon opposite a sprocket 114 carried by motor shaft 116. A drive chain 112 passes over sprockets 110 and 114 whereby the mechanism is driven by the motor 118.

Mounted on the shaft 116 adjacent the sprocket 114 is a brake drum 120. A brake band 122, Fig. 22, passes around the drum 120 and may be actuated by linkage 124 to grip the drum. This brake serves as the brake for the car and by locking the brake the car may be held stationary on the track.

As shown in Figs. 25 and 30, and generally indicated as 126, six 12-volt batteries are connected in series with one terminal 128 grounded to the frame of the car. The other terminal 130 leads to the speed control box 132, shown in Fig. 24, through connector 133. To recharge the batteries, the battery charger is coupled to the batteries through connector 133. The speed control box is provided with variable resistors adapted to control the amount of current flowing through the motor, thereby providing a speed control therefor. The batteries 126 lie between the axles of the wheels of the car and are enclosed by the shield 135. A lid 137 mounted upon hinges 139 is adapted to close the battery compartment. The batteries serve in part to counterweight a tunnel section supported ahead of the car.

As shown in Figs. 22 and 23, a plurality of vertical rods 134, mounted upon plate 92 of the car, support a second plate 136 spaced above the plate 92. Inverted L-shaped frame members $137_a$ and $139_a$ support a third plate 141 spaced above the plate 136. At the forward end of the car (Fig. 23) supported upon the plate 92 by the washer 138 is a bearing shaft support 142 for the tunnel section supporting boom generally indicated as 140, Fig. 13. The bearing shaft support comprises the vertical shaft 142 provided at its lower end with a stud 144 which extends through aligned holes in the washer 138 and the plate 92. The upper end of the shaft exhibits a threaded stud portion 146 with a nut 148 threadedly secured thereto and adapted to lock the shaft to the underside of the plate 136.

Encircling the shaft is a pair of bearing members 150 and 152 each comprising upper and lower halves separated by ball bearings 154 adapted to run in bearing grooves formed in the opposed faces of the upper and lower halves. Journaled upon the shaft between the bearings 150 and 152 is the boom-supporting block 156, provided with a bearing sleeve 158 which sleeve bears directly against the shaft 142. The block 156 is thereby rotatably supported on the car through being journaled by bearing sleeve 158 upon the shaft 142 between the bearings 150 and 152.

The tunnel section supporting boom 140 comprises a pair of parallel rectangularly shaped in cross section hollow boom members 160 and 162. These two boom members are welded as at 166, or otherwise secured to the block upon opposite sides of a projection 164 of the block 156 as shown in Fig. 23.

At the rear side of projection 164 is secured the link member 167 which link is pivotally coupled with the hydraulic cylinder and piston combination 168, as shown in Figs. 13 and 25. The opposite end of the cylinder piston combination is swiveled by a pivotal connection 170 to the shield 135. This cylinder piston combination 168 is adapted to swing the tunnel section supporting boom laterally of the car about the shaft 142.

Figure 14:
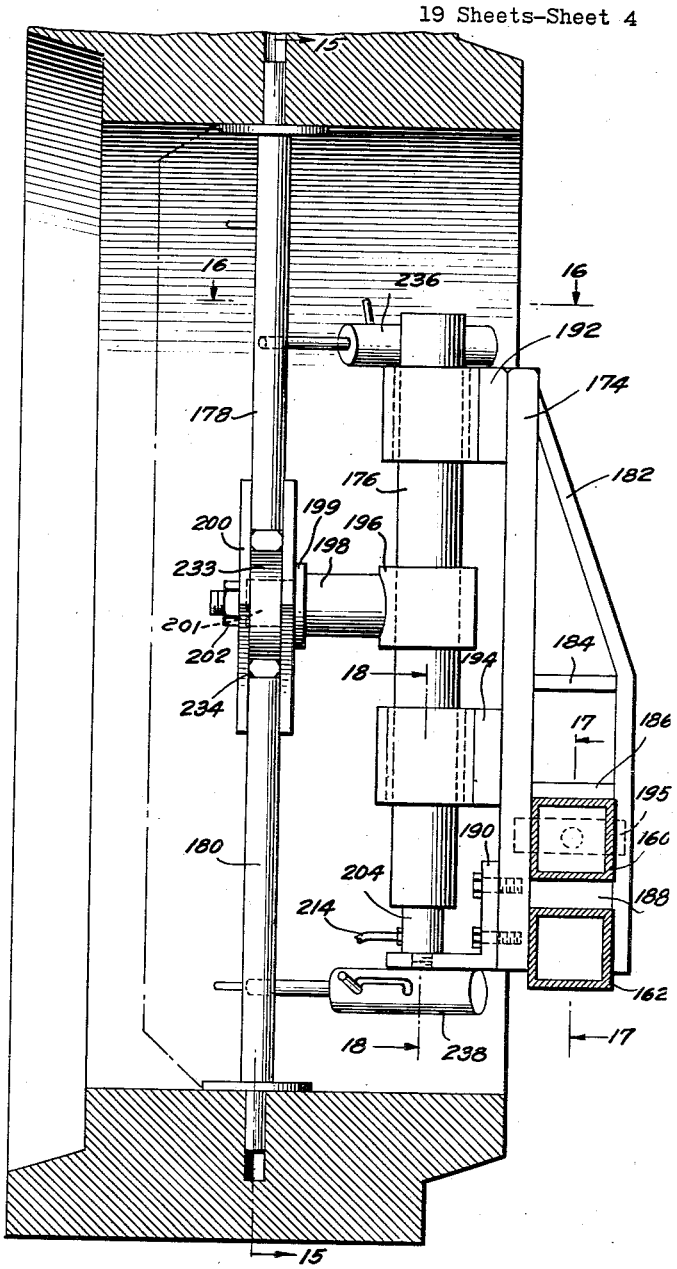
Fig. 14 is a cross sectional view taken on line 14—14 of Fig. 13.

At the outer end of the boom 140 is mounted the tunnel section supporting head 172 shown in Figs. 13, 14, and 15. The head comprises a bracket portion replaceably receivable over the end of the boom and a tunnel ring section supporting portion pivotally mounted upon the bracket. The bracket consists of a vertically extending member 174 and a bracing member 182 connected at its upper end to the top of the member 174 and diverging from member 174 as it extends downwardly until meeting strut 184, after which bracing member 182 parallels member 174, spaced therefrom by the width of the parallel boom members 160 and 162. The strut 184 is welded or the like to members 174 and 182. Two additional struts 186 and 188 parallel strut 184 and are welded at each end to the members 174 and 182. Struts 186 and 188 are spaced apart by the cross sectional height of boom member 160, with the vertical dimension of strut 188 being such as to permit it to slidably fit within the space between the boom members 160 and 162.

By virtue of the particular relationship of bracing member 182 to the member 174, and the interposition of struts 186 and 188 between members 174 and 182 of the bracket, the entire supporting head 172 may be slidably received upon the end of the supporting boom. Such slidable connection between the supporting head and the boom permits ready interchangeability of supporting heads and allows heads of varying sizes to be mounted on the boom, thereby utilizing the same tunnel section supporting car for handling different sizes of tunnel ring sections.

The overlapping relation of struts 186 and 188 with the parallel boom members is shown in Figs. 14 and 17. Blocks 187 and 189 fixed on the boom members limit the rearward slidable movement of the supporting head. A plate 191 welded inside the end of boom member 160 is adapted to threadedly receive a hook 192. A bar 195, receiving therethrough the shank of hook 193, overlies the end of boom member 160 and is adapted to overlie the edges of bracket members 174 and 182, thereby detachably securing the supporting head to the end of the boom. The hook 193 is also adapted to be coupled to a mud car so that the tunnel section supporting car may be employed as a locomotive to haul the mud car, loaded with earth removed from the heading, out of the tunnel.

This bracket assembly mounted on the end of the boom carries the tunnel ring section engaging and supporting mechanism. Fixed to the lower end of the bracket member 174, as shown in Fig. 14, is an L-shaped bearing bracket 190. At the opposite or upper end of the member 174 is fixed a bearing block 192. Intermediate the bearing bracket 190 and the bearing block 192 is fixed a second bearing block 194. The bearing blocks 192 and 194 and bracket 190 are adapted to rotatably support a vertical shaft 176. Approximately midway between the ends of shaft 176 is fixed a part 196 provided with a horizontal stub axis or spindle 198 over which is rotatably mounted a hub 200 which hub carries tunnel ring engaging arms 178 and 180. A nut 202 is threadedly received over the reduced end of the spindle 198 and is adapted to hold the hub thereon. The spindle is provided with a flange 199 and a hub-supporting portion 201 adjacent to the flange as shown in Fig. 14.

The rotatable shaft 176 is also axially slidable within its mounting on the bracket. A part 204 is telescopically received in the lower end of shaft 176 as shown in Fig. 18, and the shaft is adapted to reciprocate linearly of the part. This part 204 is seated at one end upon the bracket 190. The part 204 and associated mechanism is adapted to impart slidable movement to the shaft 176. The details of the part 204 in the lower end of the shaft 176 are shown in Fig. 18. The shaft is interiorly bored out as at 206 to receive the part 204. The part itself is interiorly bored out as at 207 to receive slidably the plunger 208. The plunger at its upper end is tapered as at 210. The upper end of the bore 206 in the shaft is shaped to complement the upper end of the plunger to form therewith a bearing contact such as illustrated at 211.

The lower end of the plunger 208 is provided with packing 212 which encircles the plunger and bears against the inside wall of the bore 207 of the part 204. A hydraulic line 214 communicates with the interior of the bore 207 of part 204 at the lower end thereof and is adapted to feed hydraulic fluid into the bore and urge the plunger 208 upwardly to raise the shaft.

As can now be readily appreciated, if hydraulic fluid is fed through line 214 to the part 204, the shaft 176 will be slidably raised, carrying with it the spindle 198 and the hub 200 with its arms 178 and 180. Because the shaft 176 is rotatably as well as slidably mounted in the bearing blocks 192 and 194, and because the hub 200 provided with the arms 178 and 180 is rotatably mounted upon the spindle 198, and because the boom itself is laterally swingable, substantially universal movement of a tunnel ring section, carried by the arms 178 and 180 about and along a plurality of axes, may be accomplished.

More specifically the arms may be revolved about the horizontal axis of spindle 198, which horizontal axis may be vertically displaced through raising and lowering shaft 176. Such horizontal axis is also revolvable about the axis of shaft 176 parallel to the line of vertical displacement thereof. When together with such universal movement of arms 178 and 180 is also considered the lateral displacement of the boom 140, it can be appreciated that a succeeding tunnel ring section supported on the arms 178 and 180 can be tilted and rotated both about horizontal and vertical axes and also bodily displaced along horizontal and vertical axes. Therefore universal movement may be imparted to a tunnel ring section mounted upon arms 178 and 180.

The ring-engaging arms 178 and 180 are shown in Fig. 15. To couple a tunnel ring section to the arms, each arm is provided at its free end with a washer 216. The washers are fixedly mounted upon the arms and are adapted to support the weight of a tunnel section upon the arms. Each of the arms is interiorly bored out to slidably receive plungers 218 and 220. Each of the plungers is provided with a pin 222 which extends through a slot 224 formed in each of the arms. Each slot is shaped at its opposite ends to provide an offset portion 226 and into which the pins may be seated to lock the plungers in either retracted or extended positions. The plungers are spring-urged within the arms by coil springs 228 and 230 outwardly of such arms.

As shown in Figs. 1, 2, and 15, each of the tunnel ring sections is provided with a pair of apertures or recesses 232 diametrically opposed and spaced midway between the opposite ends of each section measured along the tubular axis thereof. With the apertures or recesses so positioned in each ring section, when the plungers 218 and 220 are introduced thereinto, the section is rotatably supported at its center of mass by the hub upon the spindle 198. The section is also tiltably supported upon the plunger 218. The washers 216 take the weight of the section when it is in the position shown in Figs. 13, 14, and 15. The plungers keep the section properly positioned upon the arms 178 and 180. At any position of rotation of the section it is supported at its center of mass. Such manner of support enables a section weighing well over a ton to be easily revolved about the spindle 198 by one man. A bearing 233, encircling the spindle 198 fastened as at 234 to the hub, ensures the easy revolution of a heavy tunnel section.

A pair of stops 236 and 238 mounted respectively upon bracket bearings 192 and 190 adjacent the top and bottom of the shaft 176 serve to keep the arms 178 and 180 in the position shown in Figs. 13, 14, and 15 as a succeeding tunnel ring section is being carried through the already installed portion of the tunnel. Each of the stops is provided with a spring-loaded plunger 240 having an actuating and locking pin 242, and a slot 244 formed in the wall of the stop to receive therethrough the actuating and locking pin (Fig. 16). Each slot exhibits at its opposite ends an offset portion into which the pin may be moved to lock the plunger in the extended or retracted position. The plungers of the stops when extended abut the arms 178 and 180 on the same side of the axis of revolution of the arms so that when the plungers are in their extended positions the arms will not be permitted to revolve about the spindle 198.

As an alternative to the use of these stops to prevent revolution of the arms 178 and 180, a chain such as that shown in Figs. 28 and 29 may be employed. It is to be understood that with the use of this chain the stops shown in Figs. 14 and 16 need not be employed in the supporting head. The stop 236 is completely eliminated. The stop 238 is replaced by a fixed bar 246, or rod, which is mounted as is stop 238 to the underside of bracket 190, as shown in Fig. 28. The bar extends to a position such that it abuts arm 180 when it is in the vertical position shown. A chain 248 is coupled by a link 250 to the arm 178. The chain extends around the tunnel section mounted on the arms 178 and 180 and is removably coupled at its other end, through a bracket 252 mounted on plate 141, to the car as shown in Fig. 29.

The bracket is provided with a V-shaped notch (Fig.

29) into which one link of the chain may be dropped to lock the chain to the bracket. A coil spring 254, having its ends fastened to the chain with a slack portion of the chain between the ends of the spring, is adapted to maintain a tension on the chain and hold the tunnel ring section in the position shown in Fig. 13. The chain and spring exert a tension which tends to revolve the arms 178 and 180 in a direction such that the arm 180 is constantly held against the bar 246. The chain also tends to prevent the tunnel ring section and the shaft 176 from revolving about a vertical axis. The chain tends to hold the ring section against the supporting boom 140 and keep it from bumping against the inside of the completed tunnel as the section is carried therethrough.

The rear end of the car is weighted as at 260 behind the cockpit generally indicted as 262, to counterbalance the weight of a tunnel section suspended ahead of the car. Within the cockpit are the control levers for operating movement of the car and of the tunnel section supporting head. The brake lever 264 is coupled with the link mechanism 124, shown in Fig. 23 and upon actuation of the brake lever the car may be locked in one position on the track. A speed control lever 266 is coupled with the variable resistors within the speed control box 132 and the speed of the car may be controlled by this lever.

The lever 268 is coupled with the piston of the hydraulic pump 270 shown in Figs. 24 and 27. Upon actuation of this lever, hydraulic fluid pressure is built up within the pump and the fluid under pressure is led through a line 272 into a valve 274 and thence into the cylinder piston combination 168. With the valve 274 in the position shown in Fig. 27, hydraulic fluid from the pump enters the cylinder-piston combination to urge the piston thereof outwardly of the cylinder and thereby move the supporting block 156 and laterally position the tunnel section supporting boom 140.

The tunnel section supporting boom is moved in the opposite direction by a reversal of valve 274 from the position shown in Fig. 27 to one in which hydraulic fluid from pump 270 passed through line 272 and thence through line 276 into the opposite end of the cylinder-piston combination. A valve 278 is provided in the line 280 through which exhaust fluid from the cylinder-piston combination is led to the reservoir 282. This valve is adapted to maintain a back pressure against the piston such that the piston may be locked in any desired position merely by closure of the valve 278. When the valve 278 is closed and a pressure is built up in pump 270, hydraulic fluid cannot escape from the cylinder-piston combination and the piston will be locked in position. The reservoir 282 feeds the fluid through line 284 to the pump 270.

The piston of a second pump 286 is adapted to be actuated by the lever 288. This pump is connected by line 290 to valve 292. The line 214 leads from valve 292 to the part 204 at the lower end of the shaft 176 in the tunnel section supporting head. Upon actuation of the pump by lever 288, and with the valve 292 in the position shown in Fig. 27, the plunger 208 in the part 204 in the tunnel section supporting head is raised and the shaft 176 consequently raised. With a tunnel ring section mounted on the arms 178 and 180, upon actuation of the lever 288 the tunnel ring section is raised.

A second line 294 extends from valve 292 back to the reservoir 282. This line is a drain for the hydraulic fluid within the bore 207 of the part 204 which has raised the plunger. With the valve 292 rotated approximately 90° from the position shown in Fig. 27, the hydraulic fluid will pass under pressure of gravity back through line 214, through valve 292 and line 294 into the reservoir.

It will be understood that the hydraulic system shown in the various figures of the drawings, and above described, is merely an illustrative embodiment and a mechanical linkage might equally well be used in its stead.

In the operation of the tunnel ring supporting and positioning apparatus shown in Fig. 13, and in the method of laying sections by my improved process, a large shaft is first sunk in the ground. An earthen tunnel long enough to receive one length of tunnel ring section is then dug to one side of the shaft. A tunnel ring section is then lowered down the shaft and placed in the earthen tunnel with the major axis of the section vertical, the minor axis, horizontal, and the tubular axis extending in the direction the tunnel is to run. Earth is then dug out from ahead of this installed section forming a heading. The installed section may then be jacked into this heading and a succeeding section placed in the earthen tunnel behind the installed section with the corresponding axes of the sections aligned. The operation is then repeated until a plurality of tubular sections have been thus installed.

Thereafter the track is lowered down the shaft and placed on the bottom of the installed sections with a portion of the track extending across the bottom of the shaft. The car is then lowered down the shaft and placed on the track with the boom of the car extending toward the eye of the installed portion of the tunnel. A mud car is lowered down the shaft and placed on the track and coupled to the tunnel section supporting car by the hook 193 on the end of the boom. The operator, then sitting in the cockpit 264, runs the tunnel section supporting car into the installed or completed portion of the tunnel pushing ahead of it the mud car. A heading is dug ahead of the completed tunnel sufficient to receive one or more lengths of tunnel ring sections, with the removed earth being loaded into the mud car. The tunnel section supporting car then draws the mud car out of the tunnel and thereafter the mud car is lifted out of the shaft.

Following removal of the mud car, a tunnel ring section is lowered down the shaft. The ring section is seated on the track between the car and the eye of the tunnel with the tubular axis of the section paralleling the rails of the track. The actuating and locking pins 222 mounted in the arms 178 and 180 are moved in their slots to retract the plungers 218 and 220 which are locked in the retracted positions. The car is then run forward until the supporting head is within the tunnel ring. The plungers 218 and 220 are aligned with the recesses 232 and the actuating pins 222 released, permitting the rods 218 and 220 to snap into locking engagement with the recesses of the tunnel ring section.

With the tunnel section so mounted on the arms 178 and 180, the pump 286 is actuated and hydraulic fluid is fed to the part 204 in the tunnel section supporting head. The supply of fluid to part 204 serves to slidably raise the shaft 176, and through the spindle 198 and the arms 178 and 180, also to raise the tunnel section off the track. The tunnel section while so supported is then revolved so that it is suspended above the track, as shown in Fig. 13 with its major axis parallel the tubular axis of the completed portion of the tunnel.

If the stops shown in Figs. 14, 15, and 16 are employed in the supporting head, the spring-loaded plungers are released by their actuating pins 242 and the arms 178 and 180 are locked in the position shown in Figs. 14 and 15. If the chain 248 is employed, one end is hooked over the ring 250 and the other end carried back to and, after a tension is created in the spring 254, hooked in the bracket 252.

The pump 270 is now actuated to laterally move the boom and carry the tunnel ring into alignment with the eye of the tunnel to be moved therethrough. The car is then run through the completed portion of the tunnel carrying the tunnel section ahead of it suspended above the track, as shown in Fig. 13.

It is to be noted that the tunnel section while so suspended ahead of the car by the boom, is suspended ahead of the point of the weight of the tunnel section upon the floor of the completed tunnel. The tunnel section is also, while so suspended, carried at its center of mass as hereinabove mentioned, and is revolvable and displaceable along both its horizontal and vertical axes.

When the car has moved the tunnel section into the heading, the actuating pins 242 are moved to retract the spring-loaded plungers of the stops, if the stops are employed. If the chain is used, the end thereof fastened to the bracket 252 is released. The tunnel section is then revolved about the spindle 198 until the major axis of the section is parallel to the major axes of the tunnel ring sections comprising the completed portion of the tunnel. The section is then revolved about the axis of shaft 172 in the supporting head until the minor axis of the section is parallel to the minor axes of the ring sections of the completed portion of the tunnel. Then through combined lateral movement of the boom and slidable movement of the shaft 172, the tunnel section is brought into tubular alignment with the completed portion of the tunnel. The suspended section may be tilted as well as rotated and shiftably displaced laterally and vertically. When accurately aligned, the car is moved as though to back it out of the tunnel. Such movement of the car carries the suspended tunnel section back against the end of the completed portion of the tunnel to form a tubular continuation thereof. The backing movement of the car to carry the suspended tunnel section against the end of the completed tunnel is accomplished with sufficient force to ensure a tight seal between the meeting edges of the suspended section and the terminal end section of the completed tunnel. Suitable joint sealing compound may be employed if desired.

It may also be noted that the car may be moved so that the suspended tunnel section is positioned within two or three inches of the end of the completed portion of the tunnel and then a final adjustment of position of the suspended tunnel section may be accomplished, thereby ensuring accurate alignment of the suspended section with the terminal end section of the completed tunnel. Rapid acceleration of the car in a direction as though to back it out of the tunnel causes the suspended section to be jammed against the end of the completed portion of the tunnel thereby ensuring a tight seal between the suspended section and the terminal end section of the completed portion of the tunnel.

The actuating pins 222 are then moved to retract the rods 218 and 220 and the arms 178 and 180 are thereby uncoupled from the section. The car is then backed out of the tunnel and the operation repeated.

From a consideration of Figs. 1, 2, 3, 13, and 31–33, and the foregoing description, it will be noted that the tunnel ring section supported ahead of the car, is capable of movement upon the supporting boom from a position wherein the tubular axis of the tunnel ring is disposed substantially perpendicular with respect to a longitudinal plane of the boom to a position wherein the tubular axis of the ring is disposed substantially parallel to a longitudinal axis of the boom. Such movement occurs when the tunnel ring section is moved from the position shown in Fig. 1 to the position shown in dotted outline in Fig. 2. Such movement is also shown when a tunnel ring section is moved from the position shown in Fig. 31 through the position shown in Fig. 33. In Fig. 31 the tubular axis of the ring is disposed perpendicular to a longitudinal plane of the boom 140. In Fig. 32 the tunnel ring has been rotated about an axis substantially perpendicular to a longitudinal plane of the boom, and in Fig. 33 the tunnel ring has been rotated from the position of Fig. 32, to one in which the tubular axis is substantially parallel to a longitudinal plane of the boom.

When a tunnel is to be constructed for a considerable distance underground, it is desirable to sink an access shaft at a determined point or determined points intermediate its proposed length and construct the tunnel in opposite directions away from the access shaft. The practice with the hereinabove described embodiment of the invention has been to construct the tunnel in first one direction away from the access shaft and when such branch is completed, to construct the tunnel in the opposite direction away from the access shaft. While the construction of both branches simultaneously is preferable because it reduces the overall construction time, the apparatus must be turned around each time it is desired to continue construction in that branch extending rearwardly of the tunnel section handling vehicle. While two vehicles might be provided facing in opposite directions, such increases the cost of machinery at each tunneling job. However, with the provision of the modified form of the invention hereinafter described, and shown in Figs. 36–55, the tunnel may be constructed simultaneously in opposite directions away from the access shaft.

Fig. 36 illustrates the general method of constructing a tunnel in opposite directions from a common access shaft employing my modified apparatus. The surface of the ground below which the tunnel is being constructed is indicated at 330, the access shaft at 332, a suitable hoisting mechanism at 334, and a succeeding tunnel ring section to be lowered down the access shaft at 336. In constructing the tunnel from opposite sides and in opposite directions from the access shaft, a pair of branches 338 and 340 are extended in opposite directions, and at the leading end of each branch the earth is excavated and succeeding tunnel sections are installed to form tubular continuations of the branches. A shield or the like 342 may be telescoped over the leading end of each branch as shown. Each shield may be provided with a plurality of fluid pressure operated rams 344, only one of which is shown in each shield, and which rams abut the leading end of the installed tunnel to urge the shield forwardly through the ground. Suitable conveying mechanism 346 may be disposed within each shield and as the earth is excavated at the leading end of the shield, it is placed upon such conveying mechanism to be carried thereby rearwardly to a mud car 348 disposed upon a track 350 extending along the floor of the installed portion of the tunnel and across the floor of the access shaft 352.

The modified apparatus for handling tunnel sections is shown schematically at 352 in Fig. 36, and makes possible the simultaneous construction of both branches 338 and 340. As the heading at the leading end of branch 340 is being excavated, a succeeding tunnel section 354 mounted upon the apparatus 352 may be carried from the access shaft 332 through branch 338 and installed at the leading end thereof. During this time the heading at the leading end of branch 340 may be sufficiently excavated such that the succeeding tunnel section 336 can be installed in the heading at the leading end of branch 340 following the removal of the mud car 348. The mud car 348 is lifted out of the tunnel through the access shaft 332 by the hoisting mechanism 334, and the succeeding section 336 is lowered into the tunnel by the hoisting mechanism. Because both branches 338 and 340 may be constructed simultaneously as above mentioned, the construction of the tunnel may be accomplished in a much shorter period of time than is possible when employing the single-boom apparatus heretofore described.

The modified apparatus indicated generally at 352 in Fig. 36 is shown in greater detail in the remaining figures of the drawing and includes a wheeled truck portion 356 (Fig. 37) and tunnel section supporting boom means 358 extending in opposite directions beyond the truck and swingably mounted thereupon for limited rotation about a vertical axis generally indicated at 360 disposed intermediate the ends of the truck. The wheeled truck may be provided with four pairs of wheels, the pairs adjacent outer ends of the vehicle being indicated at 362 and those inwardly at 364. Wheels 362 are unflanged while wheels 364 are provided with spaced-apart flanges 66 as best shown in Fig. 39. The wheels are mounted upon suitable axles 68 supported in bearing blocks 370. A pair of chain sprockets or the like 372 are mounted on each axle and are connected together by suitable chain drives 374, all as shown in Figs. 40, 41, and 42.

The flanged wheels 364 serve to keep the truck on the track 350 and along with wheels 362, through chain drives 374, serve to provide the necessary traction for driving the truck along the track. With the provision of unflanged wheels 362 outwardly of flanged wheels 364, the truck is permitted to follow curves in the track without tending to derail the truck. By placing the flanged wheels 364 nearer the center of the truck than the unflanged wheels, the truck is enabled to follow rather sharp turns in the track. The unflanged wheels in no way serve to maintain the truck on the track but only to furnish additional support for the truck and additional traction.

Mounted in bearing blocks 376, immediately above the innermost axles 368, as shown in Figs. 40-42, are the shafts 378. The bearing blocks 376 are supported upon longitudinally extending truck frame members 380 to the underside of which the axle bearings 370 are secured. Upon each of shafts 378 is mounted, adjacent the outer ends of the shafts, a pair of chain sprockets 381, and inwardly of the sprockets 381 a pair of chain sprockets 382. Entrained over sprockets 381 and extending downwardly therefrom to sprockets 384 mounted on the innermost axles 368 are the chain drives 386.

Disposed intermediate sprockets 384 and mounted on shafts 378 are the brake drums 388, shown in Fig. 40 of the brake assembly 390, shown in top view in Fig. 42. The brake assembly includes a brake band 392 extending around each drum 388 and adjustably fastened at one end as by the bolt 394, the end of which is secured in any convenient manner as at 396 to the truck. The other end of the brake band 392 is coupled to a spring-tensioned connecting link 398, the outer end of which extends through a wall 400 of the truck and through a slot in a pivoted member 402, with a nut or the like 401 threadedly received over the end of the link and in abutment with member 402, as shown in Figs. 40, 51, and 52. Member 402 is mounted upon a pivot shaft 404 which is supported between a pair of brackets 406 secured in any convenient manner to vertical wall 400. Mounted upon pivot shaft 404 intermediate the member 402 and brackets 406 is a forked foot pedal 408, the bottom edge of which is adapted to abut member 402. Upon depression of the pedal to pivot the member 402, the brake band 392 is tightened about its drum. Upon tightening of brake band 392 the wheels 362 and 364 are braked at opposite ends of the truck through connecting means hereinafter described.

Mounted upon the frame members 380 of the truck, as shown in Fig. 42, are two pairs of adjustable bearing block assemblies 410 and 412. As the block assemblies are of similar construction, a description of one will suffice. As shown in Fig. 40, the block assembly includes a U-shaped base portion 414 between the upstanding sides of which the bearing block proper 416 is shiftably mounted and adjustably secured by bolts 418. Horizontally extending adjustment screws 420 extend through the upstanding sides of the base 414 and abut the bearing block 416 to position the block intermediate the sides of the base 414.

Mounted within the bearings 416 and extending laterally between and beyond the truck frame members 380 are a pair of shafts 422, upon each of which and intermediate the block assemblies are two pairs of chain sprockets 424. Entrained over sprockets 424 and extending to and entrained over sprockets 382 are chain drives 426. On the outer end of each shaft 422 is mounted a chain sprocket 428 with a pair of chain drives 430 extending between and entrained over the sprockets. Chain drives 430 serve to tie together the axles and shafts 378 and 422 at each end of the truck. A pair of suitable electric motors 432, mounted upon a laterally extending plate 434 resting upon and secured to the upper edges of frame members 380, are connected by chain drives 436 to a chain sprocket 438 mounted on each shaft 422. Because of the chain drive 430 connecting together shafts 422, each motor 432 will supply driving power to all of the wheels of the truck, with the result that if one wheel of the truck be partially raised from the track 350, both motors will nevertheless act upon those wheels remaining on the track.

At opposite ends of the truck are control stations indicated generally in Fig. 36 at 440 and 442 at either of which an operator may control the movement and operation of the tunnel section handling apparatus. As the stations are similar, a description of one will suffice. A control station is shown in detail in Figs. 37-40, 51, and 52. The station includes an operator supporting platform 444 pivotally mounted as at 445 upon a pair of bracket assemblies 446 and 448 for swingable movement from a horizontal position, such as shown in Figs. 38 and 40, to a vertical position such as shown in Fig. 37. A stop member 450, shown in Fig. 40, is secured to the lower end of each bracket assembly and is adapted to abut an angle member 452 secured to the underside of the platform 444, to position the platform 444 in a horizontal position when it is swung downwardly from a vertical position. As shown in Fig. 47, the underside of platform 444 includes a laterally extending web 451 through which is removably received a pin 453 which extends into a provided aperture in the end of the longitudinally extending truck frame members 380, and is adapted to secure the platform in a vertical position when not in use. The brake pedal 408, disposed immediately above the platform as shown in Fig. 40, is adapted to be pivoted upwardly upon upward pivotal movement of the platform 444 to swing the pedal to an inoperative vertical position. Control means hereinafter described are mounted in opposite ends of a portion of the boom means for operation by the operator while standing on platform 444. The operator uses that control station at the opposite end of the apparatus from that at which a succeeding tunnel section is supported.

A heavy gauge metal housing 454 is welded as at 456 to the frame members 80, as shown in Figs. 41 and 42, to enclose the sprockets 428 and chain drives 430. The top 458 of the housing 454 extends lengthwise of the truck and serves to form a partial cover for the space intermediate the frame members 380. Extending between and connected to the frame members 380 intermediate the ends of the truck are a pair of spaced-apart vertical walls 460, shown in Fig. 37. The top 458 of housing 454 extends over and is secured to vertical walls 460 in any convenient manner as by welding or the like. Disposed between the upper edges of vertical walls 460 is a plate 462 provided with an annular opening therein adapted to receive the lower end of the bearing spindle 464. The spindle is held down against the plate 462 by bolts 466 or the like extending through a collar 468 which encircles the spindle. The collar and spindle may be provided with cooperating shoulder portions which serve to lock together the collar and spindle. The spindle 464 is adapted to form the axis of rotation of the boom means 358 mounted on the truck.

The boom means 358 is adapted to support a tunnel section for shiftable movement at opposite ends of the vehicle and placement against the leading end of an installed portion of a tunnel under construction. The boom means includes a pair of oppositely extending booms 470 and 472 secured to opposite sides of a boom carriage 474 which is mounted on the truck for limited rotation about the vertical axis 60 upon spindle 464. Any suitable means, such as bolts 476, may be employed to secure the booms 470 and 472 to the opposite sides of the carriage. It will be noted in Fig. 38 that the booms extend completely along the opposite sides of the carriage and project beyond opposite ends of the carriage and the truck. The distance that the booms extend beyond the carriage and the truck is such that a tunnel ring section, as shown in Fig. 37, may be suspended for swingable movement at the end of the boom without abutting the carriage or truck.

The carriage is in the form of a rectangular box formed of heavy gauge metal, with the sides indicated at 478 and 480 and the ends at 482 and 484. At opposite ends and overlying opposite sides of the carriage are side plate members 486 forming means into which the bolts 476 are received for holding the booms on the carriage. A plate 487 extends between plates 486 at the upper surface of the carriage and a plate 488, shown in Fig. 49, extends between plates 486 at the lower ends thereof. A pair of vertical webs 490 extend between the plates 487 and 488 and are secured thereto and to the end walls 482 and 484 of the carriage. The floor plate 488 forms a bearing surface against which tapered roller bearings 492 abut to support opposite ends of the carriage for movement over the truck.

In the center of the carriage a pair of webs 494 and 496 angle downwardly from the top wall 498 of the carriage toward and are secured to the bearing block 500, with opposite ends of webs 494 and 496 secured to the sides 478 and 480 of the carriage. Bearing block 500 encircles the lowermost shoulder of spindle 464 to withstand lateral thrust on the carriage. Immediately above bearing 500 is an axial thrust bearing 502 held downwardly by a retainer plate 504. The retainer plate is held down against the thrust bearing by a suitable clamping nut or the like 506 threadedly received over the upper end of spindle 464. The upper end of spindle 464 may be bifurcated as shown in Fig. 39 with a lifting pin 508 extended between the bifurcations, with the pin and bifurcated end of the spindle providing means whereby the apparatus may be handled by a crane such as the one schematically shown at 334 in Fig. 36. A pair of fluid pressure operated cylinder and piston combinations 510 and 512 are disposed between the floor 514 of the carriage and the top wall 458 of the truck and are connected at opposite ends to the truck and carriage as shown in Fig. 50, to impart limited rotation to the carriage.

The opposite ends of housing 454 are indicated at 516 and 518 in Figs. 37, 42, 48, and 49, and extend laterally across and between the frame members 380. The end walls are secured to the cover plate 458 as by welding or the like 520. Projecting outwardly from the end walls 516 and 518 at opposite ends of the truck are plates 522 which may be secured to the end walls as by welding or the like 524. The plates 522 overlie the longitudinally extending truck frame members 380 in spaced relation and are rigidly supported above the frames 380 by vertically extending webs 400 and 528 and supports 526 (see Fig. 40). The webs are secured to the frames 380 as by welding or the like and to the plates 522 as by the welding 530.

Resting upon the plates 524 are a pair of tapered roller bearing assemblies 532 and 534, the roller bearings 492 of which have been hereinbefore mentioned as being adapted to abut the underside of the bearing plate 488 of the carriage. From consideration of Figs. 48 and 49, it will be noted that the bearing assemblies are so disposed upon the plates 522 that the axes of rotation of the bearings 492 extend angularly toward the center of the truck.

By virtue of such disposition of the axes of the rollers 492, and the tapered character of the rollers, they offer very little drag upon rotatable movement of the carriage over the truck. Each bearing assembly includes a base plate 536 which is secured as by means of bolts 538 to the plate 522, with a pair of upstanding shoulders 539 welded to the base plate and suitably apertured to receive the bearings and roller supporting pin 540. A set screw or the like 542 is adapted to retain the rollers 492 upon their pins 540. To prevent the entry of foreign matter into the bearing assemblies, a shield 544 is secured as by means of welding or the like 546 to the truck and extends around the edge of plate 522 with a top wall or lip portion 548 extending over the bearing assemblies and between the outermost shoulders thereof and plate 488 of the carriage.

As the booms 470 and 472 are of similar construction, a description of one will suffice for both. The booms are of generally rectangular shape in cross section and provided with side walls 550 and top walls 552 and bottom walls 554. Opposite ends of the booms are closed by suitable plates such as a plate 556 shown in Fig. 39, secured to the top, bottom, and side walls by bolts or the like 557. At the outer projecting end of each boom is mounted a tunnel section supporting head generally indicated in Fig. 36 at 558 and 560. Each head is adapted to support a succeeding tunnel section at the end of the boom for shiftable movement in a manner hereinafter described.

To counterbalance the weight of a tunnel section supported by the heads at the projecting ends of the booms, a shiftable counterweight is provided which may be moved away from that end of the apparatus at which a tunnel section is supported, and toward the opposite end of the apparatus. Such counterweight comprises a pair of heavy metal wheeled bodies 562, see Fig. 38, one mounted within each of the hollow booms for movement longitudinally therethrough. As the bodies are of similar construction, a description of one will suffice for both. One of the wheeled bodies is shown in detail in Figs. 44–46. The wheeled body 562 comprises a body portion proper 564 of solid metal, such as lead, which is encased in a frame indicated generally at 566. The frame may be formed of a plurality of plates suitably welded together as shown and hereinafter described. The frame 566 includes a pair of vertically extending members 568 and 570, between which is secured a horizontal plate 572. At the upper end of plate 568 and extending outwardly therefrom is the plate 574. The lead 564 rests upon plates 572 and 574 and is supported thereby. Side plates 576 and 578 are secured at their lower ends to plates 574 and 572.

A pair of wheels 580, only one of which is shown, are mounted on an axle 582 which extends between and is received within a pair of axle supporting blocks 584, only one of which is shown, which is in turn secured to the side plates 576 and 578 and immediately beneath plate 570, as shown in Fig. 44. At the other end of the lead body 564 is a second pair of wheels 586, shown in Fig. 45, mounted upon an axle 588 which extends between and is received through a pair of axle supports 590 which are in turn secured to a plate 592. A spacer member 587 is adapted to space the wheels 586 apart on axle 588. Plate 592 underlies member 574 of frame 566, and is secured thereto as by means of bolts or the like one of which is indicated at 594 and shown in Fig. 44. The wheels 580 and 586 are adapted to roll upon the floor 554 of the boom and support the counterweight therein for shiftable movement from one end of the boom to the other. The upper end of the body 564 may be held against lateral movement by four wheels 596 shown in Figs. 44 and 46. The wheels 596 are mounted on brackets 598 which are welded or otherwise secured to members 600 of the frame 566. The wheels 596 and brackets 598 are received within triangular pockets in the upper corners of the body 564 as shown in Fig. 46.

Means are provided extending longitudinally through the hollow booms for adjustably shifting the counterweights. Such means include a threaded member 602 supported at opposite ends in bearing blocks 604 mounted in suitably provided apertures in the boom end plates 556. The bearing blocks 604 at the projecting end of each boom are welded in the aperture in the end plate 556 as at 606. The bearing block 604 at the inner end of the boom is suitably apertured to receive therethrough bolts or the like 608 which are threaded into the end plate. A housing 610 extends around the bearing blocks 604 and at the inner end of the boom is secured to the blocks by means of bolts or the like 612, and at the projecting end of the boom is secured by means of bolts 314 threaded into the end plate 556. The ends of the threaded member 602 project through the bearing blocks 604 and therebeyond and suitable collars 616 are secured thereupon to hold the threaded member in position within the boom. Pins or the like 618 extend through the collars and into the member 602 to hold the collars in position. Each end of member 602 may be squared to receive a tool for the purpose of rotating member 602.

As shown in Fig. 44, frame plates 568 and 574 of the frame assembly 566 define a pocket in the lower outer edge of the counterweight body 564, and in such pocket is disposed means for coupling the body 564 to the threaded member 604 to permit the body to float about member 604 and still be driven longitudinally of the boom upon rotation of member 604. Such means include a ring-shaped member 620, two opposite sides of which are suitably apertured to receive the ends of pivot bolts or the like 622. Bolts 622 are threaded through members 590, with the heads of the bolts 622 received within counterbored recesses 624 in the outer surfaces of members 590. With the provision of the pivot bolts it is apparent that ring 620 may rotate about a horizontal axis. The upper and lower sides of ring member 620 are suitably apertured to receive therethrough a pivot pin 626 upon which is pivoted a threaded block 628. Pin 628 may be held in position within ring 620 by means of a suitable set screw or the like 630. Screw member 602 is adapted to be threaded through block 628 such that upon rotation of member 602, the counterweight body 564 is shifted longitudinally of the boom. It is apparent that because of the mounting of block 628 upon the vertical pin 626, and the mounting of ring 620 upon the horizontal pivot bolts 622, a generally universal movement between block 628 and the counterweight body 564 is possible and that as a result the body 564 may be said to float about the screw 602. It is also apparent that with the spacing between opposed edges of the block 628 and ring 620, and between the ring 620 and the surrounding surfaces of the frame assembly 566, even though the boom may not be accurately machined throughout its longitudinal extent, whatever variations in the surfaces of the walls thereof that may exist, such will not tend to cause a binding of the screw member 602 within the block 628.

The tunnel section supporting heads at the outer projecting ends of the booms and generally indicated at 558 and 560 in Fig. 36 are of similar construction and therefore a description of head 560 will suffice for both. As shown in Figs. 43, 53, and 54, head 560 includes a vertically extending base comprising a flat plate member 662 with three vertically extending webs 664 (see Fig. 37) secured thereto as by welding or the like 636. The lower edge of each of the webs 634 is secured as by welding 638 to the boom. At the lower end of plate 632 a pair of vertical webs 640 are secured to the boom as by welding 642 and to the plate as by means of welding 644. Bearing blocks 646 and 648 are secured as by bolts 650 to the plate 632. Extending vertically through blocks 646 and 648 for rotation and reciprocation is a generally cylindrical supporting member 652, the lower end of which is bored as at 654 to receive therewithin the upper half of the piston-cylinder combination 656.

The upper end of the piston-cylinder combination 656 is provided with a bearing member 658 having a tapered upper surface adapted to bear against the tapering floor of bore 654. Suitable fluid pressure connections, not shown, are coupled with the cylinder-piston combination to supply fluid pressure thereto and thereby raise supporting member 652.

Mounted upon supporting member 652 is a horizontally extending spindle 660 over the outer end of which is rotatably received the tunnel section supporting arm assembly 662. A cotter pin or the like 664, received through a pair of lugs 666 mounted on the outer end of spindle 660 and extending through retainer plate 668, is adapted to hold the retainer plate and arm assembly 662 on the spindle. Suitable bearings are provided between the hub 670 of the assembly and the spindle to facilitate rotation of the assembly about the spindle.

Arm assembly 662 is provided with a pair of hollow arms 672 and 674 within each of which is received a spring-loaded tunnel section engaging stud 676. Arms 672 and 674 may be provided with longitudinally extending slots 678 having an offset leg portion 680 at their inner ends. A pair of actuating pins 682 extend through the slots 678 and are received within engaging studs 676. The pins are adapted, when grasped by an operator, to shift studs 676 inwardly against the spring tension of the studs to a locked and retracted position where the pins are disposed within the offset leg 680 of the slots. Upon release of the pins from the offset legs of the slots, the engaging studs will extend to the positions shown in Fig. 43.

Each of the tunnel sections to be handled by my improved apparatus, and one of which is indicated at 354 in Fig. 43, is provided with a pair of diametrically opposed recesses 684 within which the outer ends of the engaging studs 676 are received. The arms 672 and 674 are of equal length and are provided with abutment shoulders 686 at their outer ends which are adapted to abut the inner surface of the tunnel ring section when the section is mounted on the arms. Because arms 672 and 674 are of equal length, the spindle 660 will be disposed upon the tubular axis of the tunnel ring section and at the center of mass thereof, and as a consequence the section may be readily rotated, while supported on the arms, about spindle 660. Because supporting member 652 is rotatable about a vertical axis, it is apparent that the tunnel ring shown in Fig. 43 is swingable about the vertical axis of member 652. It is also rotatable about a horizontal axis upon spindle 660. With the provision of fluid pressure cylinder-piston combination 656, the ring is shiftable along the vertical axis of member 652.

In order to limit the rotation of supporting member 652 within the bearing blocks 646 and 648, stop means are provided in the form of a pair of angularly disposed members 688 suitably welded together and to the spindle 660 as shown in Fig. 53. Members 688 are adapted to abut the base plate 632 upon swingable movement of member 652 from a position in which the tubular axis of the ring 354 extends parallel to the longitudinal axis of the boom to the position shown in Fig. 43. In order to limit the rotation of arm assembly 662 on the spindle 660, an angularly shaped stop bar 690 is provided, shaped as shown in Fig. 54 and welded as at 692 to the boom. The stop extends laterally beyond support member 652 and the hooked portion 694 of the stop member is adapted to abut the bracing webs 696 which extend between arm 674 and the hub 670 of the arm assembly, and thereby limit the rotation of the ring about the spindle. A chain or the like 698 at opposite ends of the boom (only one of which is shown), see Fig. 36, may be releasably secured to arm 672 at one end, and at the opposite end to the boom. Chain 698 and stops 688 and 690 cooperate to prevent unintended rotation of a succeeding tunnel ring section carried by the head assembly as the apparatus transports the succeeding tunnel ring through the completed portion of the tunnel.

Fig. 55 schematically shows the fluid pressure circuits in the apparatus for effecting rotatable movement of the boom means 58 and the vertical movement of a tunnel ring carried by one of the supporting heads. Such fluid pressure circuit includes an electric battery 700, one terminal 702 of which is grounded to the frame of the boom means and the other terminal 704 of which is connected to a conventional electric motor driven fluid pressure pump combination 706. Suction and return lines 708 and 710 respectively extend between the pump and a reservoir 712 which is adapted to hold a quantity of fluid to be pressurized by the pump. Discharge line 714 extends from the outlet side of the pump to a main feed line 716 connected at opposite ends to control valves 718 and 720. Said control valves are disposed at opposite ends of the carriage in the operator control stations and suitable control levers are associated with each valve to effect the opening and closing of ports therein to direct fluid pressure as hereinafter described. The valves are of conventional construction. The cylinder-piston combinations 656 located in the tunnel section supporting heads 558 and 560 are shown at the upper left and lower right-hand corners of Fig. 55 and are connected to control valves 718 and 720 by fluid pressure lines 722 and 724. It will be noted that the control valve and the cylinder-piston combination with which it is associated are disposed at opposite ends of the carriage. This is for the purpose of permitting a workman to operate the tunnel section supporting head while located at that end of the vehicle opposite the end at which the tunnel section is carried by the apparatus.

The pair of cylinder-piston combinations 510 and 512 disposed between the truck and the carriage, and which are adapted to impart rotational movement to the carriage on the truck, are shown in Fig. 55 as being connected together by fluid pressure line 726 and as being connected to the control valves 718 and 720 by suitable fluid pressure lines 728 and 730. Upon admission of fluid pressure to line 730, fluid pressure is fed to the cylinders 510 and 512 to urge the pistons thereof in one direction and effect rotation of the carriage in one direction about axis 360. Upon admission of fluid pressure to line 728, and the relieving of fluid pressure from line 730, the pistons will move in the opposite direction to effect an opposite rotation of the carriage. Suitable drain lines 732 and 734 connect the control valves 718 and 720 with the reservoir.

The pair of electric motors 432 may be driven by suitable electric storage batteries 736 and 738, shown in Fig. 38. The batteries may be connected to the motors through suitable switch controls, not shown, disposed in each control station.

What I claim is:

1. Tunnel ring section supporting and positioning apparatus comprising, in combination: a wheeled support, a load-carrying boom having one end pivotally mounted upon the wheeled support with the boom projecting forwardly thereof, said boom being swingable about its pivotal mounting upon the support, said wheeled support provided with counterweight means to counterbalance the boom and its load, tunnel ring section supporting and positioning mechanism pivotally mounted on the forward end of the boom for swingable movement about vertical and horizontal axes, said mechanism provided with means adapted to releasably engage the interior of a tunnel ring to support and position the ring with the pivotal mounting of the mechanism disposed substantially at the center of mass of the ring.

2. Tunnel ring section supporting and positioning apparatus comprising, in combination, a wheeled vehicle, a boom supported from one end upon the vehicle and projecting forwardly thereof, a head having a shaft mounted upon the forward end of the boom for rotatable and axial shiftable movement, said shaft provided with a spindle projecting normally thereto, a hub journaled upon the spindle for rotation thereabout, said hub provided with radially projecting arms having end portions adapted to engage a tunnel ring to support the ring encircling the hub substantially at the center of mass of the ring, power means coupled with the boom to swing the same relative to the vehicle, and power means coupled with the shaft to shift the same axially.

3. The invention as defined in claim 2 characterized in that each of said end portions comprises a spring-loaded plunger reciprocably disposed in the end of the arm and an actuating and locking device coupled therewith to releasably lock the plunger in the extended or retracted position.

4. The invention as defined in claim 2 characterized in that said shaft-actuating mechanism comprises a piston mounted on the boom and received within a complementary cylindrical recess formed in one end of the shaft, and means for introducing and maintaining fluid pressure between the end of the piston and the interior of the cylindrical recess to slidably move the shaft relative to the piston.

5. Tunnel ring section supporting and positioning apparatus comprising, in combination, a wheeled vehicle, a boom mounted on the vehicle and projecting forwardly thereof and supported for movement relative to the vehicle, a pair of radially extending tunnel section carrying arms journaled on the free end of the boom for rotation relative to the boom about both horizontal and vertical axes, and the free ends of said arms exhibiting tunnel ring section engaging devices adapted to internally engage and support a tunnel ring on the boom forwardly of the vehicle for rotation about said horizontal and vertical axes.

6. Tunnel ring section supporting and positioning apparatus, comprising, in combination, a wheeled vehicle, a boom mounted on the vehicle and projecting forwardly thereof, a pair of radially extending tunnel section carrying arms mounted on the free end of the boom for rotation relative to the boom about a plurality of angularly disposed axes and for linear translation in a vertical plane, power mechanism coupled with the boom and the arms and operable to impart determined movements to the arms, and said arms exhibiting tunnel ring section engaging elements adapted to interiorly engage and support a tunnel ring section on the arms for movement therewith.

7. Tunnel ring section supporting and positioning apparatus comprising, in combination: a wheeled vehicle, a boom mounted on the vehicle and projecting forwardly thereof and supported for movement relative to the vehicle, oppositely extending tunnel section carrying arms journaled on the free end of the boom for joint rotation about a plurality of angularly related axes, and the free ends of said arms provided with tunnel ring section engaging devices to engage and support a tunnel ring on the boom forwardly of the vehicle for rotation with said arms.

8. The invention as defined in claim 7 characterized in that at least one of said tunnel ring section engaging devices is shiftable beyond the end of its arm from an extended position engaging a tunnel ring section to a retracted position disengaged from the tunnel ring section.

9. The invention as defined in claim 7 characterized in that the outer free end of at least one of said arms is hollow, and the tunnel section engaging device at such end of the arm includes a pin-like member extending axially into the hollow end of the arm and axially shiftable inwardly and outwardly with respect to the arm to engage or disengage a tunnel ring section.

10. Tunnel ring section supporting and positioning apparatus comprising, in combination: a wheeled vehicle, a boom mounted on the vehicle and projecting forwardly thereof and supported for movement relative to the vehicle, oppositely extending axially aligned tunnel section carrying arms journaled on the free end of the boom for joint rotation relative to the boom about a plurality of angularly related axes, and the free ends of said arms provided with tunnel ring section engaging devices to engage and support a tunnel ring on the boom forwardly of the vehicle for rotation with said arms and for rotation about the axes of the arms.

11. Tunnel ring section supporting and positioning apparatus comprising, in combination: a wheeled vehicle, a boom mounted on the vehicle and projecting forwardly thereof, oppositely extending tunnel section carrying arms mounted on the free end of the boom for joint rotation about a plurality of angularly disposed axes and joint translation relative to the boom, and the free ends of said arms provided with tunnel ring section engaging devices to engage and support a tunnel ring section on the boom forwardly of the vehicle for rotation and translation with said arms.

12. The invention as defined in claim 11 characterized in that bearing means are provided at the free end of the boom, and a member is supported by said bearing means for shiftable movement transversely of the boom, and said arms are supported on the boom by said member for joint rotation about said plurality of angularly disposed axes, and power means are coupled to the boom and to said member for shifting the latter transversely relative to the boom.

13. Tunnel ring section supporting and positioning apparatus comprising, in combination: a wheeled vehicle, a boom mounted on the vehicle and projecting forwardly thereof, oppositely extending axially aligned tunnel section carrying arms mounted on the free end of the boom for joint rotation and translation relative to the boom, and the free ends of said arms provided with tunnel ring section engaging devices to engage and support a tunnel ring section on the boom forwardly of the vehicle for rotation and translation with said arms and for rotation about the axes of the arms.

14. Tunnel ring section supporting and positioning apparatus comprising, in combination: a wheeled vehicle, a boom mounted on the vehicle and projecting forwardly thereof and supported for movement relative to the vehicle, relatively fixed oppositely extending tunnel section carrying arms journaled on the free end of the boom to support a tunnel ring section for rotatable movement about angularly related axes, and the free ends of said arms provided with tunnel ring section engaging devices to engage and support a tunnel ring on the boom forwardly of the vehicle for rotation with said arms.

15. The invention as defined in claim 14 characterized in that said angularly related axes of rotation of the tunnel ring section supported on said arms extend through the center of mass of the tunnel ring section.

16. Apparatus for constructing tunnels from a plurality of tubular tunnel sections each having a major, a minor, and a tubular axis such that one section may be passed through another when corresponding axes are disposed perpendicular comprising: a wheeled vehicle proportionally dimensioned relative to the sections to travel therethrough, said vehicle including means mounted thereupon and projecting beyond opposite ends of the vehicle to engage and support a tunnel section at each end of the vehicle for swingable movement about angularly related axes and for passage through another section.

17. Apparatus for constructing tunnels from a plurality of tubular tunnel sections each having a major, a minor, and a tubular axis such that one section may be passed through another when corresponding axes are disposed perpendicular comprising: a wheeled vehicle proportionally dimensioned relative to the sections to travel therethrough, and tunnel section supporting means mounted upon and extending in opposite directions away from and overhanging opposite ends of the vehicle and operable to support a tunnel section at either end thereof for swingable movement about angularly related axes while the vehicle is disposed within the tunnel.

18. Tunnel section handling apparatus comprising: a wheeled vehicle, boom means mounted upon and projecting beyond opposite ends of the vehicle and including mechanism to support a tunnel section at either end of the vehicle for rotation about angularly related axes, and a shiftable counterweight mounted on the vehicle and movable toward that end of the vehicle opposite the end at which a tunnel section is supported by the boom means to counterbalance the weight of the tunnel section.

19. Tunnel section handling apparatus comprising: a wheeled vehicle, boom means mounted upon and projecting beyond opposite ends of the vehicle and including mechanism to support a tunnel section at either end of the vehicle for rotation about angularly related axes, and a counterweight mounted on said boom means for shiftable movement away from that end thereof upon which a tunnel section is supported and toward the opposite end to counterbalance the weight of the tunnel section.

20. Tunnel section handling apparatus comprising: a wheeled vehicle, a hollow boom mounted upon and projecting beyond one end of the vehicle and adapted to support a tunnel section upon the projecting end thereof, a counterweight mounted within the hollow boom for movement therethrough toward in and away from the projecting end of the boom to counterbalance the weight of a tunnel section supported thereupon.

21. Tunnel section handling apparatus comprising: a wheeled vehicle, hollow boom means mounted on the vehicle and projecting beyond opposite ends thereof to support a tunnel section at either end of the vehicle, a counterweight mounted within the hollow boom means for shiftable movement longitudinally thereof and within the projecting opposite ends, whereby the counterweight may be shifted away from that end of the boom means upon which the tunnel section is mounted to counterbalance the weight of the section.

22. Tunnel section handling apparatus comprising: a wheeled vehicle, hollow boom means mounted on the vehicle and projecting beyond opposite ends thereof to support a tunnel section at either end of the vehicle, and a counterweight mounted within the hollow boom means for shiftable movement toward and away from the projecting ends thereof to counterbalance the weight of a tunnel section carried by a projecting end of the boom means.

23. Tunnel section handling apparatus comprising: a wheeled vehicle, hollow boom means mounted on the vehicle and projecting beyond opposite ends thereof to support a tunnel section at either end of the vehicle, a counterweight mounted within the hollow boom means for shiftable movement toward and away from the projecting ends thereof to counterbalance the weight of a tunnel section carried by a projecting end of the boom means, and counterweight adjustment mechanism extending through said hollow boom means and coupled with the counterweight and operable to shift the counterweight longitudinally of the boom means.

24. Tunnel section handling apparatus comprising: a wheeled truck, a carriage mounted upon the truck for rotation about a vertical axis, tunnel section supporting boom means mounted on the carriage and projecting in opposite directions beyond the carriage and beyond the truck, tunnel section engaging and supporting mechanism journaled upon at least one projecting end of the boom means and adapted to engage and support a tunnel section for rotation about a plurality of angularly related axes.

25. Tunnel section handling apparatus comprising: a self-propelled wheeled truck, a carriage mounted upon the truck for rotation about a vertical axis disposed intermediate the ends of the truck, means coupled with the truck and with the carriage for rotatably shifting the carriage upon the truck, a pair of booms mounted upon the carriage and extending in opposite directions beyond opposite ends of the carriage and the truck, tunnel section engaging and supporting mechanism journaled upon the projecting end of each boom and adapted to support a tunnel section for rotation about a plurality of angularly related axes, and a counterweight mounted upon the booms and shiftable therealong toward and away from the projecting ends thereof to counterbalance the weight of a tunnel section carried by the booms.

26. The invention as defined in claim numbered 25 characterized in that the said booms are hollow and the counterweight is mounted within the hollow booms for shiftable movement therethrough.

27. Tunnel section handling apparatus comprising: a self-propelled wheeled vehicle, a control station at opposite ends of the vehicle at which the movement thereof can be controlled, and boom mechanism mounted on the vehicle and projecting in opposite directions beyond opposite ends of the vehicle and including rotatable devices operable to engage and support a tunnel section at opposite ends of the vehicle.

No references cited.